US009554508B2

(12) United States Patent
Balutis et al.

(10) Patent No.: US 9,554,508 B2
(45) Date of Patent: Jan. 31, 2017

(54) AUTONOMOUS MOBILE ROBOT

(71) Applicant: iRobot Corporation, Bedford, MA (US)

(72) Inventors: Paul C. Balutis, Shrewsbury, MA (US); Alec Likhite, Arlington, MA (US); Brian Doughty, Framingham, MA (US); Jeff Karlson, Framingham, MA (US); Tyler Nikitas, Lancaster, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 14/659,705

(22) Filed: Mar. 17, 2015

(65) Prior Publication Data

US 2015/0271991 A1 Oct. 1, 2015

Related U.S. Application Data

(60) Provisional application No. 61/972,752, filed on Mar. 31, 2014.

(51) Int. Cl.
*G05B 15/00* (2006.01)
*G05B 19/00* (2006.01)
(Continued)

(52) U.S. Cl.
CPC ........... *A01D 34/008* (2013.01); *G05D 1/0011* (2013.01); *G05D 1/0016* (2013.01); *G05D 1/0221* (2013.01); *G05D 2201/0208* (2013.01)

(58) Field of Classification Search
CPC .. A01D 34/008; G05D 1/0011; G05D 1/0016; G05D 1/0221; G05D 2201/0208
(Continued)

(56) References Cited

U.S. PATENT DOCUMENTS 2,751,030 A 6/1956 Null
3,128,840 A 4/1964 Barrett
(Continued)

FOREIGN PATENT DOCUMENTS

DE 19932552 2/2000
EP 0774702 5/1997
(Continued)

OTHER PUBLICATIONS

Kozlowski and Pazderski, "Modeling and Control of a 4-wheel Skid-steering Mobile Robot," International J. of Applied Mathematics and Computer Science, 2004, 14(4):477-496.
(Continued)

*Primary Examiner* — Harry Oh
(74) *Attorney, Agent, or Firm* — Fish & Richardson P.C.

(57) ABSTRACT

A robot lawnmower includes a robot body, a drive system, a localizing system, a teach monitor, and a controller in communication with one another. The drive system is configured to maneuver the robot lawnmower over a lawn. The teach monitor determines whether the robot lawnmower is in a teachable state. The controller includes a data processing device and non-transitory memory in communication with the data processing device. The data processing device executes a teach routine when the controller is in a teach mode for tracing a confinement perimeter around the lawn as a human operator pilots the robot lawn mower, when the robot lawnmower is in the teachable state, the teach routine stores global positions determined by the localizing system in the non-transitory memory, and when the robot lawnmower is in the unteachable state, the teach routine issues an indication of the unteachable state.

18 Claims, 21 Drawing Sheets

(51) Int. Cl.
  *A01D 34/00* (2006.01)
  *G05D 1/00* (2006.01)
  *G05D 1/02* (2006.01)
(58) Field of Classification Search
  USPC .................................................. 700/245–264
  See application file for complete search history.

(56) References Cited

U.S. PATENT DOCUMENTS

| | | | |
|---|---|---|---|
| 3,385,041 A | 5/1968 | Douglas | |
| 3,457,575 A | 7/1969 | Bienek | |
| 3,550,714 A | 12/1970 | Bellinger | |
| 3,674,316 A | 7/1972 | De Brey | |
| 3,924,389 A | 12/1975 | Kita | |
| 3,937,174 A | 2/1976 | Haaga | |
| 3,946,543 A | 3/1976 | Templeton | |
| 4,119,900 A | 10/1978 | Kremnitz | |
| 4,133,404 A | 1/1979 | Griffin | |
| 4,163,977 A | 8/1979 | Polstorff | |
| 4,306,329 A | 12/1981 | Yokoi | |
| 4,369,543 A | 1/1983 | Chen et al. | |
| 4,513,469 A | 4/1985 | Godfrey et al. | |
| 4,545,453 A | 10/1985 | Yoshimura et al. | |
| 4,556,313 A | 12/1985 | Miller et al. | |
| 4,600,999 A * | 7/1986 | Ito | A01B 69/008 318/587 |
| 4,603,753 A | 8/1986 | Yoshimura et al. | |
| 4,626,995 A | 12/1986 | Lofgren et al. | |
| 4,674,048 A | 6/1987 | Okumura | |
| 4,679,152 A | 7/1987 | Perdue | |
| 4,696,074 A | 9/1987 | Cavalli et al. | |
| 4,700,301 A | 10/1987 | Dyke | |
| 4,700,427 A | 10/1987 | Knepper | |
| 4,716,621 A | 1/1988 | Zoni | |
| 4,733,431 A | 3/1988 | Martin | |
| 4,756,049 A | 7/1988 | Uehara | |
| 4,767,237 A | 8/1988 | Cosman et al. | |
| 4,777,416 A | 10/1988 | George et al. | |
| 4,782,550 A | 11/1988 | Jacobs | |
| 4,811,228 A | 3/1989 | Hyyppa | |
| 4,854,000 A | 8/1989 | Takimoto | |
| 4,887,415 A | 12/1989 | Martin | |
| 4,893,025 A | 1/1990 | Lee | |
| 4,909,024 A | 3/1990 | Jones et al. | |
| 4,912,643 A | 3/1990 | Beirne | |
| 4,918,441 A | 4/1990 | Bohman | |
| 4,919,224 A | 4/1990 | Shyu et al. | |
| 4,933,864 A | 6/1990 | Evans et al. | |
| 4,962,453 A | 10/1990 | Pong et al. | |
| 4,974,283 A | 12/1990 | Holsten et al. | |
| 5,002,145 A | 3/1991 | Waqkaumi et al. | |
| 5,017,415 A | 5/1991 | Cosman et al. | |
| 5,086,535 A | 2/1992 | Grossmeyer et al. | |
| 5,093,955 A | 3/1992 | Blehert et al. | |
| 5,109,566 A | 5/1992 | Kobayashi et al. | |
| 5,142,985 A | 9/1992 | Stearns et al. | |
| 5,163,202 A | 11/1992 | Kawakami et al. | |
| 5,163,273 A | 11/1992 | Wojtkowski et al. | |
| 5,165,064 A | 11/1992 | Mattaboni | |
| 5,204,814 A | 4/1993 | Noonan et al. | |
| 5,208,521 A | 5/1993 | Aoyama | |
| 5,216,777 A | 6/1993 | Moro et al. | |
| 5,239,720 A | 8/1993 | Wood et al. | |
| 5,261,139 A | 11/1993 | Lewis | |
| 5,279,672 A | 1/1994 | Belker et al. | |
| 5,284,522 A | 2/1994 | Kobayashi et al. | |
| 5,293,955 A | 3/1994 | Lee | |
| 5,303,448 A | 4/1994 | Hennessey et al. | |
| 5,319,828 A | 6/1994 | Waldhauser et al. | |
| 5,321,614 A | 6/1994 | Ashworth | |
| 5,324,948 A | 6/1994 | Dudar et al. | |
| 5,341,540 A | 8/1994 | Soupert et al. | |
| 5,353,224 A | 10/1994 | Lee et al. | |
| 5,369,347 A | 11/1994 | Yoo | |
| 5,410,479 A | 4/1995 | Coker | |
| 5,438,721 A | 8/1995 | Pahno et al. | |
| 5,440,216 A | 8/1995 | Kim | |
| 5,444,965 A | 8/1995 | Colens | |
| 5,446,356 A | 8/1995 | Kim | |
| 5,454,129 A | 10/1995 | Kell | |
| 5,455,982 A | 10/1995 | Armstrong et al. | |
| 5,465,525 A | 11/1995 | Mifune et al. | |
| 5,467,273 A | 11/1995 | Faibish et al. | |
| 5,497,529 A | 3/1996 | Boesi | |
| 5,507,067 A | 4/1996 | Hoekstra et al. | |
| 5,515,572 A | 5/1996 | Hoekstra et al. | |
| 5,528,888 A | 6/1996 | Miyamoto et al. | |
| 5,534,762 A | 7/1996 | Kim | |
| 5,537,017 A | 7/1996 | Feiten et al. | |
| 5,539,953 A | 7/1996 | Kurz | |
| 5,542,146 A | 8/1996 | Hoekstra et al. | |
| 5,548,511 A | 8/1996 | Bancroft | |
| 5,553,349 A | 9/1996 | Kilstrom et al. | |
| 5,555,587 A | 9/1996 | Guha | |
| 5,560,077 A | 10/1996 | Crotchett | |
| 5,568,589 A | 10/1996 | Hwang | |
| 5,611,106 A | 3/1997 | Wulff | |
| 5,611,108 A | 3/1997 | Knowlton et al. | |
| 5,613,261 A | 3/1997 | Kawakami et al. | |
| 5,621,291 A | 4/1997 | Lee | |
| 5,622,236 A | 4/1997 | Azumi et al. | |
| 5,634,237 A | 6/1997 | Paranjpe | |
| 5,634,239 A | 6/1997 | Tuvin et al. | |
| 5,650,702 A | 7/1997 | Azumi | |
| 5,652,489 A | 7/1997 | Kawakami | |
| 5,682,213 A | 10/1997 | Schmutz | |
| 5,682,313 A | 10/1997 | Edlund et al. | |
| 5,682,839 A | 11/1997 | Grimsley et al. | |
| 5,709,007 A | 1/1998 | Chiang | |
| 5,711,139 A * | 1/1998 | Swanson | A01D 75/28 172/4 |
| 5,761,762 A | 6/1998 | Kubo et al. | |
| 5,781,960 A | 7/1998 | Kilstrom et al. | |
| 5,787,545 A | 8/1998 | Colens | |
| 5,794,297 A | 8/1998 | Muta | |
| 5,812,267 A | 9/1998 | Everett et al. | |
| 5,819,008 A | 10/1998 | Asama et al. | |
| 5,825,981 A | 10/1998 | Matsuda | |
| 5,839,156 A | 11/1998 | Park et al. | |
| 5,841,259 A | 11/1998 | Kim et al. | |
| 5,867,800 A | 2/1999 | Leif | |
| 5,916,111 A | 6/1999 | Colens | |
| 5,926,909 A | 7/1999 | McGee | |
| 5,935,179 A | 8/1999 | Kleiner et al. | |
| 5,940,927 A | 8/1999 | Haegermarck et al. | |
| 5,940,930 A | 8/1999 | Oh et al. | |
| 5,942,869 A | 8/1999 | Katou et al. | |
| 5,943,730 A | 8/1999 | Boomgaarden | |
| 5,943,733 A | 8/1999 | Tagliaferri | |
| 5,959,423 A | 9/1999 | Nakanishi et al. | |
| 5,974,347 A * | 10/1999 | Nelson | A01D 34/008 180/168 |
| 5,974,348 A | 10/1999 | Rocks | |
| 6,009,358 A | 12/1999 | Angott et al. | |
| 6,041,471 A | 3/2000 | Charky et al. | |
| 6,049,745 A | 4/2000 | Douglas et al. | |
| 6,073,427 A | 6/2000 | Nichols | |
| 6,076,025 A | 6/2000 | Ueno et al. | |
| 6,076,227 A | 6/2000 | Schalig et al. | |
| 6,108,076 A | 8/2000 | Hanseder | |
| 6,112,143 A | 8/2000 | Allen et al. | |
| 6,124,694 A | 9/2000 | Bancroft et al. | |
| 6,133,730 A | 10/2000 | Winn | |
| 6,140,146 A | 10/2000 | Brady et al. | |
| 6,166,706 A | 12/2000 | Gallagher et al. | |
| 6,226,830 B1 | 5/2001 | Hendriks et al. | |
| 6,240,342 B1 | 5/2001 | Fiegert et al. | |
| 6,255,793 B1 * | 7/2001 | Peless | A01D 34/008 180/168 |
| 6,259,979 B1 | 7/2001 | Holmquist | |
| 6,285,930 B1 | 9/2001 | Dickson et al. | |
| 6,300,737 B1 | 10/2001 | Begvall et al. | |
| D451,931 S | 12/2001 | Abramson et al. | |
| 6,339,735 B1 | 1/2002 | Peless et al. | |

(56) References Cited

U.S. PATENT DOCUMENTS

| | | |
|---|---|---|
| 6,374,155 B1 | 4/2002 | Wallach et al. |
| 6,385,515 B1 | 5/2002 | Dickson et al. |
| 6,408,226 B1 | 6/2002 | Byrne et al. |
| 6,417,641 B2 | 7/2002 | Peless et al. |
| 6,438,456 B1 | 8/2002 | Feddema et al. |
| 6,442,476 B1 | 8/2002 | Poropat |
| 6,443,509 B1 | 9/2002 | Levin et al. |
| 6,444,003 B1 | 9/2002 | Sutcliffe |
| 6,463,368 B1 | 10/2002 | Feiten et al. |
| 6,465,982 B1 | 10/2002 | Bergvall et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,507,773 B2 | 1/2003 | Parker et al. |
| 6,525,509 B1 | 2/2003 | Petersson et al. |
| 6,532,404 B2 | 3/2003 | Colens |
| 6,535,793 B2 | 3/2003 | Allard |
| 6,548,982 B1 | 4/2003 | Papanikolopoulos et al. |
| 6,571,415 B2 | 6/2003 | Gerber et al. |
| 6,574,536 B1 | 6/2003 | Kawagoe et al. |
| 6,580,246 B2 | 6/2003 | Jacobs |
| 6,580,978 B1 | 6/2003 | McTamaney |
| 6,584,376 B1 | 6/2003 | Kommer |
| 6,586,908 B2 | 7/2003 | Petersson et al. |
| 6,594,844 B2 | 7/2003 | Jones |
| 6,604,022 B2 | 8/2003 | Parker |
| 6,605,156 B1 | 8/2003 | Clark et al. |
| 6,611,120 B2 | 8/2003 | Song et al. |
| 6,611,734 B2 | 8/2003 | Parker et al. |
| 6,611,738 B2 | 8/2003 | Ruffner |
| 6,615,108 B1 | 9/2003 | Peless et al. |
| 6,650,975 B2 | 11/2003 | Ruffner |
| 6,658,693 B1 | 12/2003 | Reed |
| 6,661,239 B1 | 12/2003 | Ozick |
| 6,671,592 B1 | 12/2003 | Bisset et al. |
| 6,690,134 B1 | 2/2004 | Jones et al. |
| 6,741,054 B2 | 5/2004 | Koselka et al. |
| 6,748,297 B2 | 6/2004 | Song et al. |
| 6,764,373 B1 | 7/2004 | Osawa et al. |
| 6,781,338 B2 | 8/2004 | Jones et al. |
| 6,809,490 B2 | 10/2004 | Jones et al. |
| 6,830,120 B1 | 12/2004 | Yashima et al. |
| 6,841,963 B2 | 1/2005 | Song et al. |
| 6,845,297 B2 | 1/2005 | Allard |
| 6,850,024 B2 | 2/2005 | Peless et al. |
| 6,870,792 B2 | 3/2005 | Chiappetta |
| 6,883,201 B2 | 4/2005 | Jones et al. |
| 6,885,912 B2 | 4/2005 | Peless et al. |
| 6,901,624 B2 | 6/2005 | Mori et al. |
| D510,066 S | 9/2005 | Hickey et al. |
| 6,938,298 B2 | 9/2005 | Turbjorn Aasen |
| 6,940,291 B1 | 9/2005 | Ozick |
| 6,956,348 B2 | 10/2005 | Landry et al. |
| 6,971,140 B2 | 12/2005 | Se Wan Kim |
| 6,984,952 B2 | 1/2006 | Peless et al. |
| 6,999,850 B2 | 2/2006 | McDonald |
| 7,024,278 B2 | 4/2006 | Chiappetta et al. |
| 7,069,124 B1 | 6/2006 | Whittaker et al. |
| 7,085,624 B2 | 8/2006 | Aldred et al. |
| 7,155,309 B2 | 12/2006 | Peless et al. |
| 7,203,576 B1 | 4/2007 | Wilson et al. |
| 7,206,677 B2 | 4/2007 | Hulden |
| D559,867 S | 1/2008 | Abramson |
| 7,349,759 B2 | 3/2008 | Peless et al. |
| D573,610 S | 7/2008 | Abramson |
| 7,441,392 B2 | 10/2008 | Lilliestielke et al. |
| 7,481,036 B2 | 1/2009 | Lilliestielke et al. |
| 7,525,287 B2 | 4/2009 | Miyashita et al. |
| 7,729,801 B2 | 6/2010 | Abramson |
| 8,027,761 B1 * | 9/2011 | Nelson .................. A01D 34/008 180/168 |
| 8,046,103 B2 | 10/2011 | Abramson et al. |
| 8,069,639 B2 | 12/2011 | Fancher |
| D652,431 S | 1/2012 | Naslund |
| D656,163 S | 3/2012 | Johansson et al. |
| 8,136,333 B1 | 3/2012 | Levin et al. |
| 8,306,659 B2 | 11/2012 | Abramson et al. |
| 8,413,616 B2 | 4/2013 | Bergquist |
| 8,532,822 B2 | 9/2013 | Abramson et al. |
| 8,634,960 B2 | 1/2014 | Sandin et al. |
| 8,635,841 B2 | 1/2014 | Fiser et al. |
| 8,781,627 B2 | 7/2014 | Sandin et al. |
| 8,868,237 B2 | 10/2014 | Sandin et al. |
| 8,954,193 B2 | 2/2015 | Sandin et al. |
| 2001/0022506 A1 | 9/2001 | Peless et al. |
| 2001/0047231 A1 * | 11/2001 | Peless .................. A01D 34/008 701/23 |
| 2002/0011813 A1 | 1/2002 | Koselka et al. |
| 2002/0016649 A1 | 2/2002 | Jones |
| 2002/0120364 A1 | 8/2002 | Colens |
| 2002/0140393 A1 | 10/2002 | Peless et al. |
| 2002/0156556 A1 | 10/2002 | Ruffner |
| 2002/0160845 A1 | 10/2002 | Simonsen |
| 2002/0173877 A1 | 11/2002 | Zweig |
| 2003/0019071 A1 | 1/2003 | Field et al. |
| 2003/0023356 A1 | 1/2003 | Keable |
| 2003/0025472 A1 | 2/2003 | Jones et al. |
| 2003/0055337 A1 | 3/2003 | Lin |
| 2003/0060928 A1 | 3/2003 | Abramson et al. |
| 2003/0120389 A1 | 6/2003 | Abramson et al. |
| 2003/0137268 A1 | 7/2003 | Papanikolopoulos et al. |
| 2003/0144774 A1 * | 7/2003 | Trissel .................. A01D 34/008 701/23 |
| 2003/0182914 A1 | 10/2003 | Shibata et al. |
| 2003/0192144 A1 | 10/2003 | Song et al. |
| 2003/0208304 A1 | 11/2003 | Peless et al. |
| 2003/0216834 A1 | 11/2003 | Allard |
| 2003/0233177 A1 | 12/2003 | Johnson et al. |
| 2003/0234325 A1 | 12/2003 | Marino et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030571 A1 | 2/2004 | Solomon |
| 2004/0031113 A1 | 2/2004 | Wosewick et al. |
| 2004/0036618 A1 | 2/2004 | Ku et al. |
| 2004/0049877 A1 | 3/2004 | Jones et al. |
| 2004/0068351 A1 | 4/2004 | Solomon |
| 2004/0068415 A1 | 4/2004 | Solomon |
| 2004/0068416 A1 | 4/2004 | Solomon |
| 2004/0076324 A1 | 4/2004 | Burl et al. |
| 2004/0088079 A1 | 5/2004 | Lavarec et al. |
| 2004/0111184 A1 | 6/2004 | Chiappetta et al. |
| 2004/0111196 A1 | 6/2004 | Dean |
| 2004/0134336 A1 | 7/2004 | Solomon |
| 2004/0134337 A1 | 7/2004 | Solomon |
| 2004/0156541 A1 | 8/2004 | Jeon et al. |
| 2004/0158357 A1 | 8/2004 | Lee et al. |
| 2004/0187457 A1 | 9/2004 | Colens |
| 2004/0200505 A1 | 10/2004 | Taylor et al. |
| 2004/0204792 A1 | 10/2004 | Taylor et al. |
| 2004/0211444 A1 | 10/2004 | Taylor et al. |
| 2004/0220000 A1 | 11/2004 | Falone |
| 2004/0236468 A1 | 11/2004 | Taylor et al. |
| 2004/0244138 A1 | 12/2004 | Taylor et al. |
| 2005/0000543 A1 | 1/2005 | Taylor et al. |
| 2005/0007057 A1 | 1/2005 | Peless et al. |
| 2005/0010331 A1 | 1/2005 | Taylor et al. |
| 2005/0020374 A1 | 1/2005 | Wang |
| 2005/0097952 A1 | 5/2005 | Steph |
| 2005/0108999 A1 | 5/2005 | Bucher |
| 2005/0113990 A1 | 5/2005 | Peless et al. |
| 2005/0156562 A1 | 7/2005 | Cohen et al. |
| 2005/0204717 A1 | 9/2005 | Colens |
| 2005/0251292 A1 | 11/2005 | Casey et al. |
| 2005/0278094 A1 | 12/2005 | Swinbanks et al. |
| 2005/0287038 A1 | 12/2005 | Dubrovsky et al. |
| 2006/0255933 A1 * | 11/2006 | Kaneko .................. B60R 25/102 340/539.13 |
| 2006/0293794 A1 | 12/2006 | Harwig et al. |
| 2007/0016328 A1 | 1/2007 | Ziegler et al. |
| 2007/0142964 A1 | 6/2007 | Abramson |
| 2007/0150109 A1 | 6/2007 | Peless et al. |
| 2008/0039974 A1 | 2/2008 | Sandin et al. |

(56) References Cited

U.S. PATENT DOCUMENTS

| | | | |
|---|---|---|---|
| 2008/0097645 | A1 | 4/2008 | Abramson et al. |
| 2008/0167753 | A1 | 7/2008 | Peless et al. |
| 2008/0183349 | A1 | 7/2008 | Abramson et al. |
| 2009/0254218 | A1 | 10/2009 | Sandin et al. |
| 2010/0059000 | A1 | 3/2010 | Bergquist |
| 2010/0102525 | A1 | 4/2010 | Fancher |
| 2011/0130875 | A1 | 6/2011 | Abramson |
| 2011/0166701 | A1* | 7/2011 | Thacher .............. A01D 34/008 700/245 |
| 2011/0234153 | A1 | 9/2011 | Abramson |
| 2012/0041594 | A1 | 2/2012 | Abramson et al. |
| 2012/0226381 | A1 | 9/2012 | Abramson et al. |
| 2013/0006419 | A1 | 1/2013 | Bergstrom et al. |
| 2013/0030609 | A1 | 1/2013 | Jagenstedt |
| 2013/0066468 | A1* | 3/2013 | Choi ...................... B25J 9/0003 700/258 |
| 2013/0066484 | A1 | 3/2013 | Markusson et al. |
| 2013/0076304 | A1 | 3/2013 | Andersson et al. |
| 2013/0103200 | A1* | 4/2013 | Tucker ................. G01C 21/206 700/275 |
| 2013/0110322 | A1 | 5/2013 | Jagenstedt et al. |
| 2013/0152538 | A1 | 6/2013 | Fiser et al. |
| 2013/0184924 | A1 | 7/2013 | Jagenstedt et al. |
| 2013/0249179 | A1 | 9/2013 | Burns |
| 2013/0274920 | A1 | 10/2013 | Abramson et al. |
| 2014/0102061 | A1 | 4/2014 | Sandin et al. |
| 2014/0102062 | A1 | 4/2014 | Sandin et al. |
| 2014/0117892 | A1 | 5/2014 | Coates |
| 2014/0257659 | A1* | 9/2014 | Dariush ................. G08G 1/166 701/70 |
| 2015/0006015 | A1 | 1/2015 | Sandin et al. |
| 2015/0220086 | A1* | 8/2015 | Willgert ............... G05D 1/0214 701/26 |
| 2016/0007315 | A1* | 1/2016 | Lundgreen ................ G01S 3/46 455/67.11 |

FOREIGN PATENT DOCUMENTS

| | | |
|---|---|---|
| EP | 0792726 | 9/1997 |
| EP | 1331537 | 7/2003 |
| EP | 1704766 | 12/2008 |
| FR | 2828589 | 2/2003 |
| GB | 2142447 | 1/1985 |
| GB | 2283838 | 5/1995 |
| GB | 2382157 | 5/2003 |
| JP | 62120510 | 6/1987 |
| JP | 62154008 | 7/1987 |
| JP | 63183032 | 7/1988 |
| JP | 63241610 | 10/1988 |
| JP | 2-6312 U | 1/1990 |
| JP | 3051023 | 3/1991 |
| JP | 04320612 | 11/1992 |
| JP | 06327598 | 11/1994 |
| JP | 07129239 | 5/1995 |
| JP | 7295636 | 11/1995 |
| JP | 816776 | 1/1996 |
| JP | 08089451 | 4/1996 |
| JP | 8152916 | 6/1996 |
| JP | 09179625 | 7/1997 |
| JP | 9185410 | 7/1997 |
| JP | 11-508810 | 8/1999 |
| JP | 11-510935 | 9/1999 |
| JP | 2001-258807 | 9/2001 |
| JP | 2001-275908 | 10/2001 |
| JP | 2001-525567 | 12/2001 |
| JP | 2002078650 | 3/2002 |
| JP | 2002-204768 | 7/2002 |
| JP | 2002-532178 | 10/2002 |
| JP | 3356170 | 10/2002 |
| JP | 2002-323925 | 11/2002 |
| JP | 3375843 | 11/2002 |
| JP | 2002-355206 | 12/2002 |
| JP | 2002-360471 | 12/2002 |
| JP | 2002-360482 | 12/2002 |
| JP | 2003005296 | 1/2003 |
| JP | 2003010076 | 1/2003 |
| JP | 2003-505127 | 2/2003 |
| JP | 2003036116 | 2/2003 |
| JP | 2003038401 | 2/2003 |
| JP | 2003038402 | 2/2003 |
| JP | 2003061882 | 3/2003 |
| JP | 2003-310489 | 11/2003 |
| WO | 95/26512 | 10/1995 |
| WO | 97/40734 | 11/1997 |
| WO | 97/41451 | 11/1997 |
| WO | 98/53456 | 11/1998 |
| WO | 99/16078 | 4/1999 |
| WO | 99/28800 | 6/1999 |
| WO | 99/38056 | 7/1999 |
| WO | 99/38237 | 7/1999 |
| WO | 99/59042 | 11/1999 |
| WO | 00/04430 | 1/2000 |
| WO | 00/36962 | 6/2000 |
| WO | 00/38026 | 6/2000 |
| WO | 00/38029 | 6/2000 |
| WO | 00/78410 | 12/2000 |
| WO | 01/06904 | 2/2001 |
| WO | 01/06905 | 2/2001 |
| WO | 02/39864 | 5/2002 |
| WO | 02/39868 | 5/2002 |
| WO | 02/058527 | 8/2002 |
| WO | 02/062194 | 8/2002 |
| WO | 02/067744 | 9/2002 |
| WO | 02/067745 | 9/2002 |
| WO | 02/074150 | 9/2002 |
| WO | 02/075356 | 9/2002 |
| WO | 02/075469 | 9/2002 |
| WO | 02/075470 | 9/2002 |
| WO | 02/101477 | 12/2002 |
| WO | 03/026474 | 4/2003 |
| WO | 03/040845 | 5/2003 |
| WO | 03/040846 | 5/2003 |
| WO | 03/065140 | 8/2003 |
| WO | 2004/004533 | 1/2004 |
| WO | 2004/006034 | 1/2004 |
| WO | 2006/068403 | 1/2004 |
| WO | 2004/058028 | 7/2004 |
| WO | 2005/055795 | 6/2005 |
| WO | 2005/077244 | 8/2005 |
| WO | 2007/109624 | 9/2007 |
| WO | 2014/027946 | 2/2014 |

OTHER PUBLICATIONS

Caracciolo et al., "Trajectory Tracking Control of a Four-Wheel Differentially Driven Mobile Robot," IEEE Int. Conf. Robotics and Automation, Detroit, MI, 1999, pp. 2632-2638.

Kimura et al., "Stuck Evasion Control for Active Wheel Passive-Joint Snake-like Mobile Robot 'Genbu'," Proceedings of the 2004 IEEE International Conference on Robotics 8 Automation, New Orleans, LA, Apr. 2004, 6 pages.

Angle et al., U.S. Appl. No. 60/177,703, filed Jan. 24, 2000, available at http://portal.uspto.gov/external/portal/pair , accessed Jul. 11, 2012, 16 pages.

Bohn et al. "Super-distributed RFID Tag Infrastructures," Lecture Notes in Computer Science, Springer Verlag, Berlin, DE, vol. 3295, Nov. 11, 2004, pp. 1-12.

Campbell et al., U.S. Appl. No. 60/741,442, filed Dec. 2, 2005, available at http://patentscope.wipo.int/search/docservicepdf_pct/id00000005206306.pdf, accessed Jul. 11, 2012, 130 pages.

Casey et al., U.S. Appl. No. 60/582,992, filed Jun. 25, 2004, available at http://portal.uspto.gov/external/portal/pair, accessed Jul. 11, 2012, 24 pages.

Domnitcheva "Smart Vacuum Cleaner—An Autonomous Location-Aware Cleaning Device," Proceedings of the International Conference on Ubiquitous Computing, Sep. 10, 2004, pp. 1-2.

Doty and Harrison, "Sweep Strategies for a Sensory-Driven, Behavior-Based Vacuum Cleaning Agent," AAAI 1993 Fall Symposium Series, Instantiating Real-World Agents, Oct. 22-24, 1993, pp. 1-6.

(56) References Cited

OTHER PUBLICATIONS

"Electrolux—Designed for the well-lived home (Welcome to the Electrolux Trilobite)," Retrieved from the Internet: URL<http://www.electroluxusa.com/node57.as[?currentURL=node142.asp%3F >. Accessed Mar. 2005, 2 pages.
"eVac Robotic Vacuum," S1727 Instruction Manual, Sharper Image Corp, Copyright 2004, 13 pages.
Everyday Robots, "Everyday Robots: Reviews, Discussion and News for Consumers," Aug. 2004, Retrieved from the Internet: URL<www.everydayrobots.com/index.php?option=content &task=view&id=9>, retrieved Sep. 2012, 4 pages.
Evolution Robotics, "NorthStar—Low-cost Indoor Localization—How it Works," E Evolution Robotics, 2005, 2 pages.
Non-final Office Action issued in U.S. Appl. No. 11/688,225, dated Feb. 24, 2011, 30 pages.
Non-final Office Action issued in U.S. Appl. No. 12/488,094, dated Jan. 26, 2011, 25 pages.
Non-final Office Action issued in U.S. Appl. No. 11/688,213, dated Jan. 27, 2011, 27 pages.
Non-final Office Action issued in U.S. Appl. No. 12/488,094, dated Jul. 28, 2011, 13 pages.
Final Office Action issued in U.S. Appl. No. 11/688,225, dated Nov. 10, 2011, 45 pages.
"Facts on Trilobite," webpage, Retrieved from the Internet: URL<http://trilobiteelectroluxse/presskit_en/model1_1335asp?print=yes&pressID=>, accessed Dec. 2003, 2 pages.
Gat, "Robust Low-Computation Sensor-driven Control for Task-Directed Navigation," Proc of IEEE International Conference on Robotics and Automation, Sacramento, CA, Apr. 1991, pp. 2484-2489.
Hicks and Hall, "A Survey of Robot Lawn Mowers," http://www.robotics.uc.edu/papers/paper2000/lawnmower.pdf, 2000, 8 pages.
Hitachi: News release: "The home cleaning robot of the autonomous movement type (experimental machine) is developed," May 29, 2003, Retrieved from the Internet: URL<www.i4u.com./japanreleases/hitachirobot.htm>, retrieved Mar. 2005, 5 pages.
International Preliminary Report on Patentability issued in International Application No. PCT/US2007/064323, dated Sep. 23, 2008, 10 pages.
International Preliminary Report on Patentability dated Sep. 23, 2008 from International Application No. PCT/US2007/064326, dated Sep. 23, 2008, 10 pages.
International Search Report and Written Opinion issued in PCT/US2007/064326, dated Jul. 17, 2008, 6 pages.
International Search Report and Written Opinion issued in PCT/US2007/064323, dated Jun. 16, 2008, 14 pages.
International Search Report and Written Opinion issued in PCT/US2015/020865, dated Jun. 25, 2015, 10 pages.
Karcher "Karcher RoboCleaner RC 3000," Retrieved from the Internet: URL www.robocleaner.de/english/screen3.html, accessed Dec. 2003, 4 pages.
Karcher, RC 3000 Cleaning Robot-User Manual Manufacturer: Alfred-Karcher GmbH & Co, Cleaning Systems, Alfred Karcher-Str 28-40, PO Box 160, D-71349 Winnenden, Germany, Dec. 2002, 8 pages.
Karcher USA, "RC3000 Robotic Cleaner," 2005, Retrieved from the Internet: URL http://www.karcher-usa.com/showproducts.php?op=view prod¶m1=143&param2=&param3=, accessed Mar. 2005, 3 pages.
Karcher, "Product Manual Download 'Karch'," available at www.karcher.com, 2004, 16 pages.
KOOLVAC Robotic Vacuum Cleaner Owner's Manual, Koolatron, 2004, 13 pages.
Kubitz et al., "Application of radio frequency identification devices to support navigation of autonomous mobile robots" Vehicular Technology Conference, vol. 1, May 4, 1997, pp. 126-130.
Matthies et al., "Detecting Water Hazards for Autonomous Off-Road Navigation," Proceedings of SPIE Conference 5083: Unmanned Ground Vehicle Technology V, Orlando, FL, Apr. 2003, pp. 231-242.
Morland, "Autonomous Lawnmower Control," Downloaded from the internet at: http://cns.bu.edu/~cjmorlan/robotics/lawnmower/report.pdf, Jul. 2002, 10 pages.
On Robo, "Robot Reviews Samsung Robot Vacuum (VC-RP30W)," 2005, Retrieved from the Internet: URL www.onrobo.com/reviews/AT_Home/vacuum_cleaners/on00vcrb30rosam/index.htm, accessed Mar. 2005, 2 pages.
Invitation to Pay Additional Fees issued in International Application No. PCT/US2007/064326, dated Apr. 18, 2008, 9 pages.
"RoboMaid Sweeps Your Floors So You Won't Have to," the Official Site, Retrieved from the Internet: URLhttp://therobomaid.com/, accessed Mar. 2005, 2 pages.
Robotic Vacuum Cleaner-Blue, Retrieved from the Internet: URL http://www.sharperimage.com/us/en/catalog/productview.jhtml?sku=S1727BLU, accessed Mar. 2005, 2 pages.
Schofield, "Neither Master nor Slave—A Practical Study in the Development and Employment of Cleaning Robots," Emerging Technologies and Factory Automation, 1999 Proceedings ETFA '99 1999 7th IEEE International Conference on Barcelona, Spain, Oct. 1999, pp. 1427-1434.
TheRobotStore.com, "Friendly Robotics Robotic Vacuum RV400—The Robot Store," www.therobotstore.com/s.nl/sc.9/category.-109/it.A/id.43/E, accessed Apr. 2005, 1 page.
Thrun, "Learning Occupancy Grid Maps With Forward Sensor Models," Autonomous Robots 15, Sep. 1, 2003, 28 pages.
Wigley, "The Electric Lawn", in *The American Lawn*, Princeton Architectural Press New York with Canadian Centre for Architecture Montreal, 1999, pp. 155-195.
Kahney, "Wired News: Robot Vacs are in the House," Jun. 2003, Retrieved from the Internet: URLwww.wired.com/news/technology/o,1282,59237,00.html, accessed Mar. 2005, 5 pages.
"Put Your Roomba . . . On, Automatic" webpages: http://www.acomputeredge.com/roomba, accessed Apr. 2005, 3 pages.
"Zoombot Remote Controlled Vaccuum-RV-500 New Roomba 2," eBay website: http://cgi.ebay.com/ws/eBayISAPI.dll?ViewItem &category=43526&item=4373497618&rd=1, accessed Apr. 2005, 7 pages.

\* cited by examiner

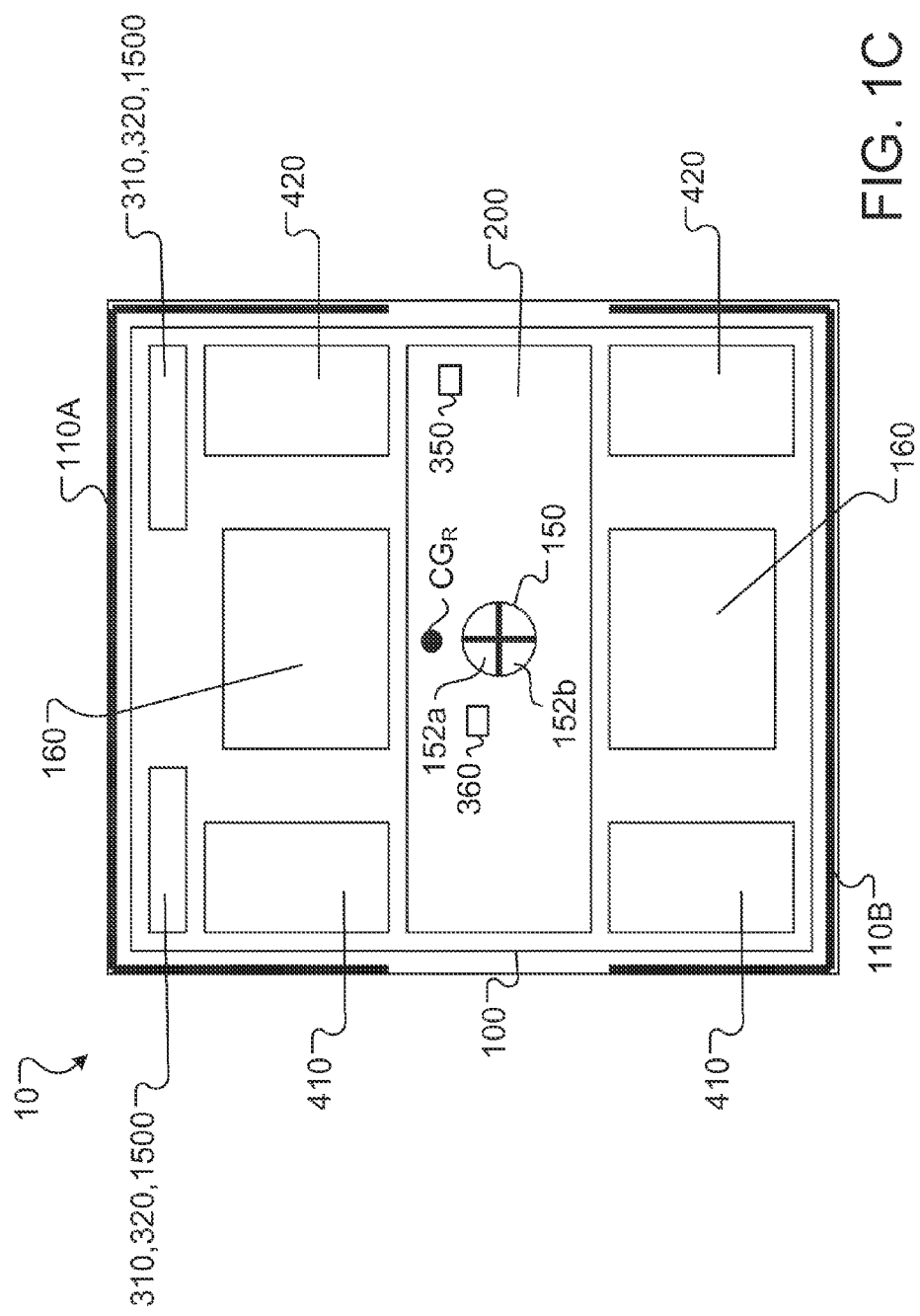

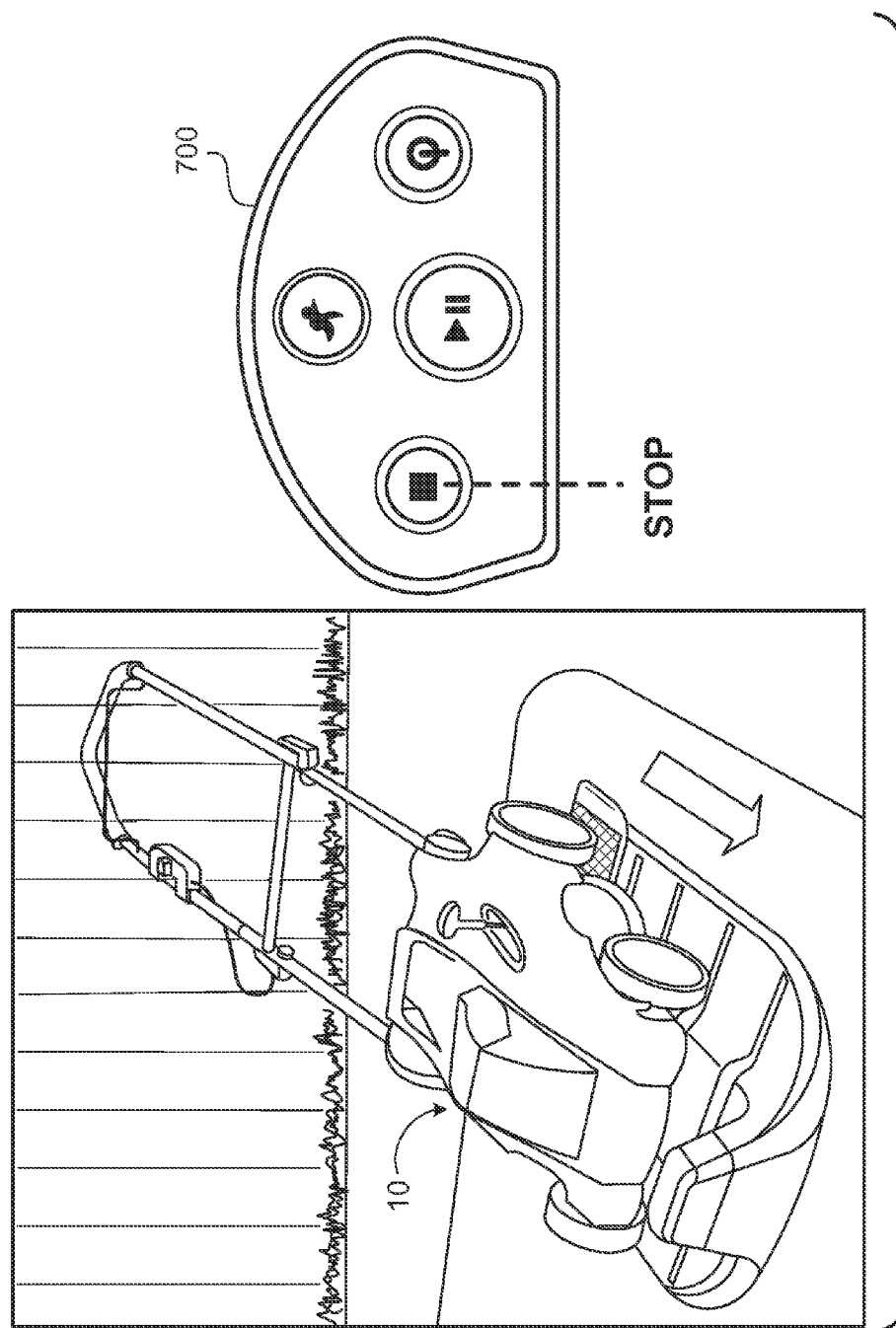

AUTONOMOUS MOBILE ROBOT

CROSS-REFERENCE TO RELATED APPLICATIONS

This application claims priority to U.S. Provisional Application Ser. No. 61/972,752, filed on Mar. 31, 2014, the entire contents of which are hereby incorporated by reference.

TECHNICAL FIELD

This disclosure relates to an autonomous mobile robot for grass cutting.

BACKGROUND

Autonomous robots that perform household functions such as floor cleaning and lawn cutting are now readily available consumer products. Commercially successful robots are not unnecessarily complex, and generally operate randomly within a confined area. In the case of floor cleaning, such robots are generally confined within (i) touched walls and other obstacles within the rooms of a dwelling, (ii) IR-detected staircases (cliffs) down; and/or (iii) user placed detectable barriers such as directed IR beams, physical barriers or magnetic tape. Walls provide most of the confinement perimeter. Other, much less ubiquitous robots may try to localize or to map the dwelling using a complex system of sensors and/or active or passive beacons (e.g., sonar, RFID or bar code detection, or various kinds of machine vision).

Some consumer robotic lawn mowers use a similar "invisible" barrier—a continuous guide conductor boundary proposed for confining random motion robotic mowers by the early 1960's. The guide conductor is intended to confine the robot within the lawn or other appropriate area, so as to avoid damaging non-grassy areas of the yard or intruding onto a neighboring property. The conductor is one continuous loop around the property to be mowed. Although the guide conductor can be drawn into the property in peninsulas to surround gardens or other off limits areas, it remains a continuous loop, and is energized with an AC current detectable as a magnetic field at a few feet. The guide conductor must be supplied with power, usually from a wall socket. Within the bounded area, the known robots may "bounce" randomly as the robot nears the guide conductor, or may follow along the guide conductor. Some of the mowers also touch and bounce from physical barriers. More complex commercial mowers may try to localize or to map the mowing area, again using a complex system of sensors and/or active or passive beacons (e.g., sonar, encoded optical retro-reflector detection, machine vision).

SUMMARY

According to one aspect of the invention, a robot lawnmower includes a robot body, a drive system supporting the robot body and configured to maneuver the robot lawnmower over a lawn, a localizing system configured to determine perimeter positions of the robot lawnmower with respect to an origin, a teach monitor in communication with the localizing system and configured to determine whether the robot lawnmower is in a teachable state (with the robot lawnmower localized and on traversable terrain) or in an unteachable state, and a controller in communication with the drive system, the localizing system, and the teach monitor. The controller includes a data processing device and non-transitory memory in communication with the data processing device, and is configured to execute a teach routine when the controller is in a teach mode for tracing a confinement perimeter around the lawn as a human operator pilots the robot lawnmower with the robot lawnmower in the teachable state, while the teach routine stores perimeter positions determined by the localizing system in the non-transitory memory.

In some embodiments the robot lawnmower also includes an operator feedback unit in communication with the teach monitor or the controller. The operator feedback unit is configured to emit, in response to determining that the robot lawnmower is in the unteachable state, a human-perceptible unteachable state alert signal. In some cases, the unteachable state alert signal indicates a piloting correction in a pose or a motion of the robot lawnmower calculated to return the robot lawnmower to the teachable state. The operator feedback unit may be in wireless communication with one or more boundary markers positioned along the perimeter of the lawn, and/or may be in wireless communication with the controller and comprises a user interface configured for remotely piloting the robot lawnmower, for example.

In some examples the robot lawnmower also has a sensor system in communication with the teach monitor and includes at least one of: an inertial measurement unit responsive to a moment of inertia of the robot lawnmower, an obstacle sensor responsive to proximity of an obstacle or water along a drive path of the robot lawnmower, a tilt sensor responsive to tilt of the robot body, a cliff sensor responsive to a discrete ground elevation change proximate the robot body or a drive element of the drive system, a drop sensor responsive to a drop of a drive element of the drive system, an accelerometer responsive to speed of the robot lawnmower across the lawn, and a confinement sensor responsive to proximity of the robot lawnmower to a boundary marker. In some cases the teach monitor is configured to determine that the robot lawnmower is in the unteachable state in response to a signal from the sensor system.

In some cases the controller, executing the teach routine, is configured to determine a traveled path of the robot lawnmower based on the stored perimeter positions and whether the traveled path begins and ends proximate the origin.

The origin may comprise coordinates marked by one or more boundary markers positioned in the lawn, for example. In some applications the robot lawnmower includes a boundary detection scanner disposed on the robot body and configured to perform a scan match on three or more adjacent boundary markers, with each of the three or more boundary markers being individually identifiable by adjacent scan match data. The teach routine may determine a travel path of the robot lawnmower by scan matching a current travel path scan with a stored travel path scan.

Another aspect of the invention features a method of configuring a robotic lawnmowing system for autonomous operation. The method includes receiving, at a data processing device, perimeter positions of a robot lawnmower with respect to an origin, receiving, at the data processing device, a state of the robot lawnmower indicating whether the robot lawnmower is in a teachable state, with the robot lawnmower localized and on traversable terrain, or in an unteachable state, and executing, on the data processing device, a teach routine that traces a confinement perimeter around a lawn as a human operator pilots the robot lawnmower, while the teach routine stores received perimeter positions in non-transitory memory when the robot lawnmower is in the teachable state, and issues an unteachable state indication when the robot lawnmower is in the unteachable state.

In some examples of the method, the unteachable state indication comprises a human-perceptible signal emitted by the robot lawnmower. For example, the unteachable state indication may indicate a piloting correction in a pose or a motion of the robot lawnmower selected to return the robot lawnmower to the teachable state.

The origin may comprises coordinates marked by one or more boundary markers positioned in the lawn.

In some embodiments the teach routine, executing on the data processing device, compares a current perimeter position stored in the non-transitory memory to previously stored perimeter positions and determines whether a variance is greater than a threshold variance from a stored travel path.

Another aspect of the invention features a robotic lawnmower system with a localizing system that records each global position of a robot lawnmower with respect to a global origin as a human operator pilots the robot lawnmower to trace a confinement perimeter around a lawn in a manual confinement perimeter teaching mode, contour memory in which a geometric contour of the confinement perimeter is recorded while the human operator pilots the robot lawnmower for a duration of operation in manual confinement perimeter teaching mode, the geometric contour defining a perimeter that the robot lawnmower is to avoid crossing in an autonomous mode, and a teaching property monitor configured to detect whether or not the robot lawnmower is piloted in a recordable state and on traversable terrain. The robotic lawnmower system also includes an operator feedback unit in communication with the teaching property monitor and comprising a progress indicator capable of emitting a human-perceptible signal configured to alert the human operator to an unrecordable state or untraversable terrain, and to indicate a piloting correction to return the robot lawnmower to a recordable state or traversable terrain.

In some examples the operator feedback unit is mounted on a push bar of the robot lawnmower.

In some embodiments the operator feedback unit is in wireless communication with one or more boundary markers positioned along the confinement perimeter, and is configured to indicate a piloting correction in response to the robot lawnmower travelling proximate to or beyond the perimeter.

In some cases the travel path of the robot lawnmower is localized by determining angle and range of the robot lawnmower to three or more boundary markers.

Further features and advantages will be apparent from the following description of embodiments.

DESCRIPTION OF DRAWINGS

FIG. 1C is a schematic view of an exemplary autonomous lawn care mobile robot.

FIG. 7F is a schematic view of an exemplary autonomous lawn care mobile robot being docked in its base station.

Like reference symbols in the various drawings indicate like elements.

DETAILED DESCRIPTION

Figure 1A:
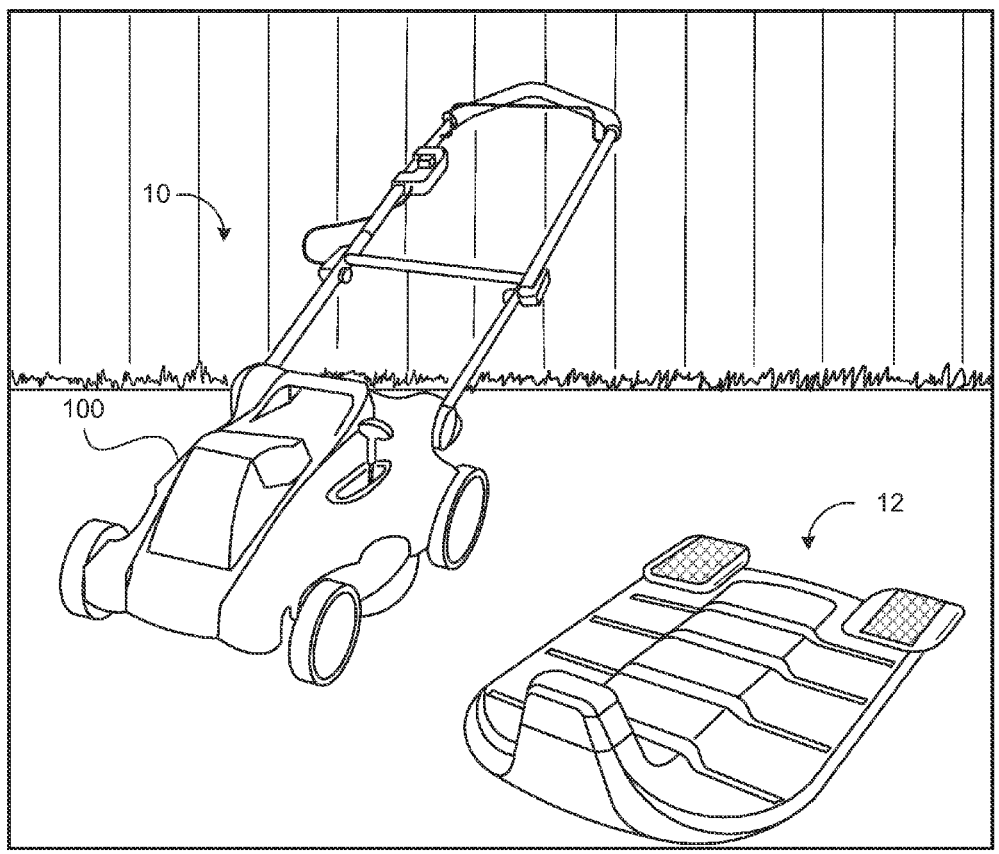
FIG. 1A is a perspective view of an exemplary autonomous lawn care mobile robot and its base station.
Figure 1B:
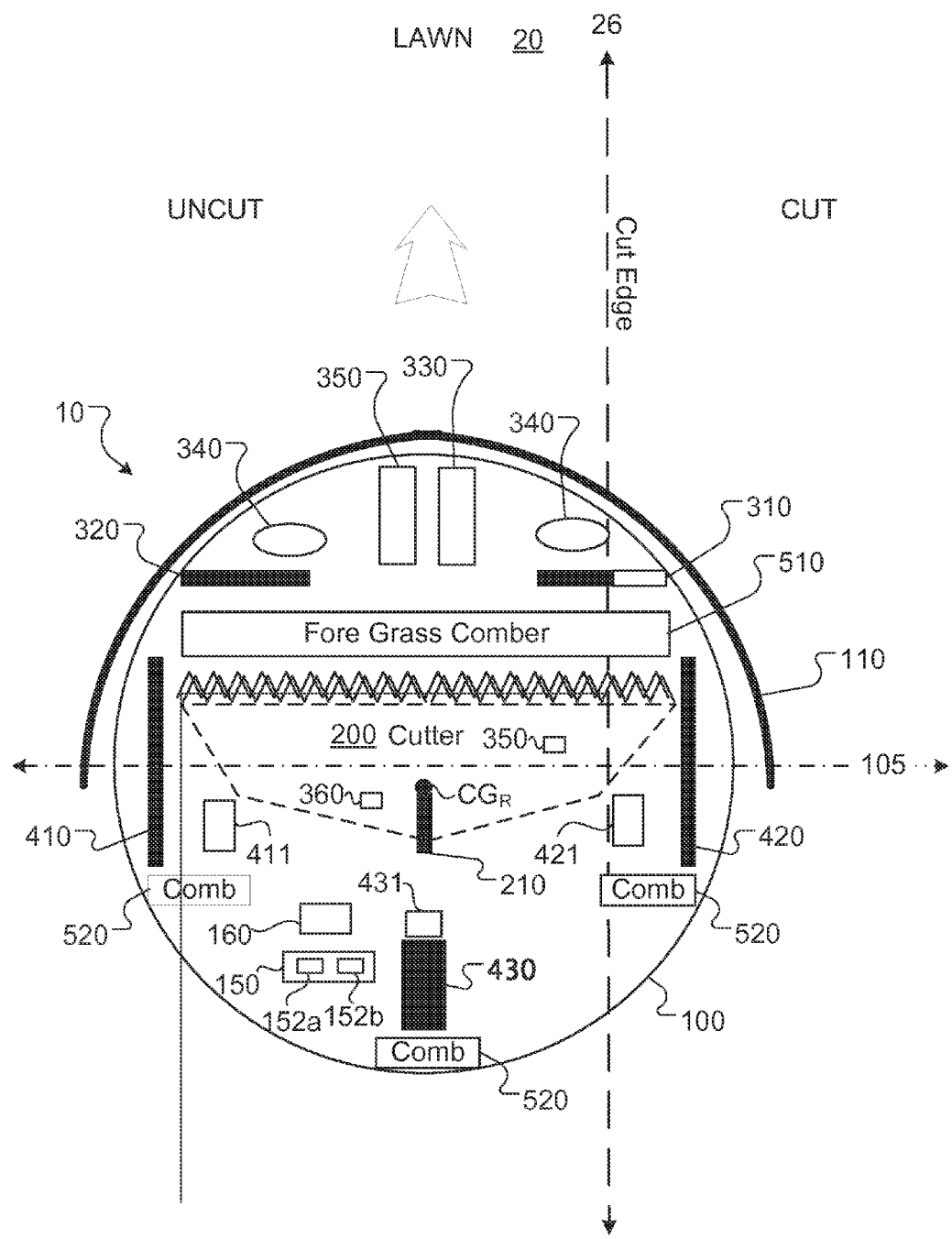
FIG. 1B is a schematic view of an exemplary autonomous lawn care mobile robot.

An autonomous robot may be designed to mow a lawn. For example, the autonomous robot may move about the lawn and cut the grass as it is traversing the lawn. Referring to FIGS. 1A-1C, a robot lawnmower 10 includes a body 100, a surface treater 200 secured to the body 100, a drive system 400, and a sensor system 300 having at least one surface sensor 310, 320, 330 carried by the body 100 and responsive to at least one surface characteristic. The drive system 400 is carried by the body 100 and configured to maneuver the robot 10 across a surface 20 (e.g., lawn) while following at least one surface characteristic. Examples of the surface treater 200 include a reciprocating symmetrical cutter floating on a following wheel 410, a rotary cutter, a spreader, and a gatherer. The robot body 100 supports a power source 106 (e.g., a battery) for powering any electrical components of the robot 10. The robot lawnmower 10 may be docked at a base station 12. In some examples, the base station 12 includes a charging system for changing a battery 160 housed by the robot body 100.

The body 100, as shown in FIG. 1B, has a substantially circular perimeter, and the body 100 shown in FIG. 1C, had a substantially rectangular perimeter; however, other shapes may be suitable as well, such as a substantially pentagonal, or tombstone shape. In some implementations, the body 100 includes a two part articulated body, each part having a different shape than the other part. For example, the two parts articulated body has a front portion and a rearward portion. The front portion has a circular shape and the rearward portion has a rectangular or square portion. In some implementations, the robot 10 includes a frame-and-body structure or a substantially monocoque structure.

In some examples, one or more edge following sensors 310 (also referred to as cut edge detectors) and edge calibrators 320 (e.g. a grass character sensor) are mounted on the body 100. FIGS. 1B and 1C depicts an exemplary placement of boundary sensors 340, a bumper 110 (which may be coupled to two or more displacement sensors to provide impact directionality) and at least one grass sensor 330 (e.g. determines a presence of grass) on the body 100. An active or passive fore grass comber 510 precedes the surface treater 200 and an aft grass comber 520 follows each wheel 410, 420, 430. Referring to FIG. 1C, the bumper 110 includes a first portion 110*a* and a second portion 110*b*. A configuration and height of the bumper 110, in some instances, are arranged according to a ground clearance or a cut height of the cutter 200. The bumper height may be lower than the cut height of the cutter 200. Also, the bumper 110 may rise and lower with the cutter 200.

Figure 2:
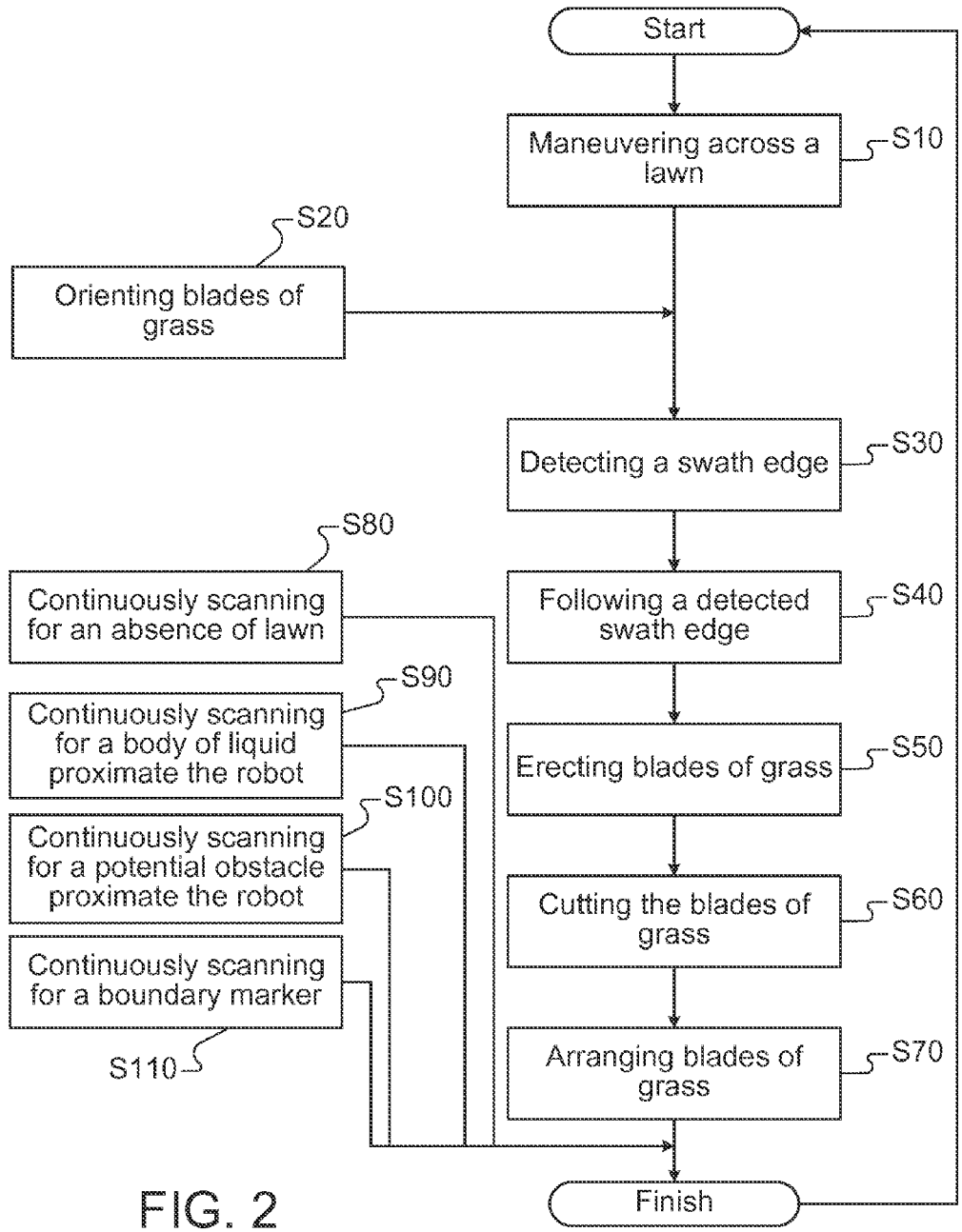
FIG. 2 is a schematic view of a method of lawn cutting with an autonomous lawn care mobile robot.

Referring to FIG. 2, a method of lawn cutting with a robotic lawnmower 10 having a drive system 400, a sensor system 300, and a cutter system 200 carried by a body 100 includes step S10 of activating the drive system 400 to maneuver the robotic lawnmower 10 across a lawn 20, step S30 of detecting a swath edge 26 with the swath edge detector 310, and step S40 of following a detected swath edge. The method may include step S20 of orienting blades of grass of the lawn 20 with a grass arranger 440 carried by the body 100 forward of a swath edge detector 310 carried by the body 100. The method includes step S50 of erecting blades of grass of the lawn 20 with a fore grass comber 510 carried by the body 100 forward of the cutter 200, step S60 of cutting the lawn 20 with the cutter 200, and step S70 of arranging blades of grass of the lawn 20 with an aft grass comber 520 carried by the body 100 rearward of the cutter 200 and/or the drive system 400. In some examples, the method includes one or more of the following steps: step S80 of continuously scanning for an absence of lawn 20 with a lawn detector 330 carried by the body 100, where the drive system 400 redirects the robot 10 in response to detecting an absence of lawn 20; step S90 of continuously scanning for a body of liquid proximate the robot 10 with a liquid detector carried by the body 100, where the drive system 400 redirects the robot 10 in response to detecting a body of liquid; step S100 of continuously scanning for a potential obstacle proximate the robot 10 with a proximity sensor (e.g. infrared sensor) carried by the body 100, where the drive system 400 redirects the robot 10 in response to detecting a potential obstacle; and step S110 of continuously scanning for a boundary markers 810 with a boundary detector 1500 carried by the body 100, where the drive system 400 redirects the robot 10 in response to detecting a boundary markers 810 (discussed below).

Figure 3:
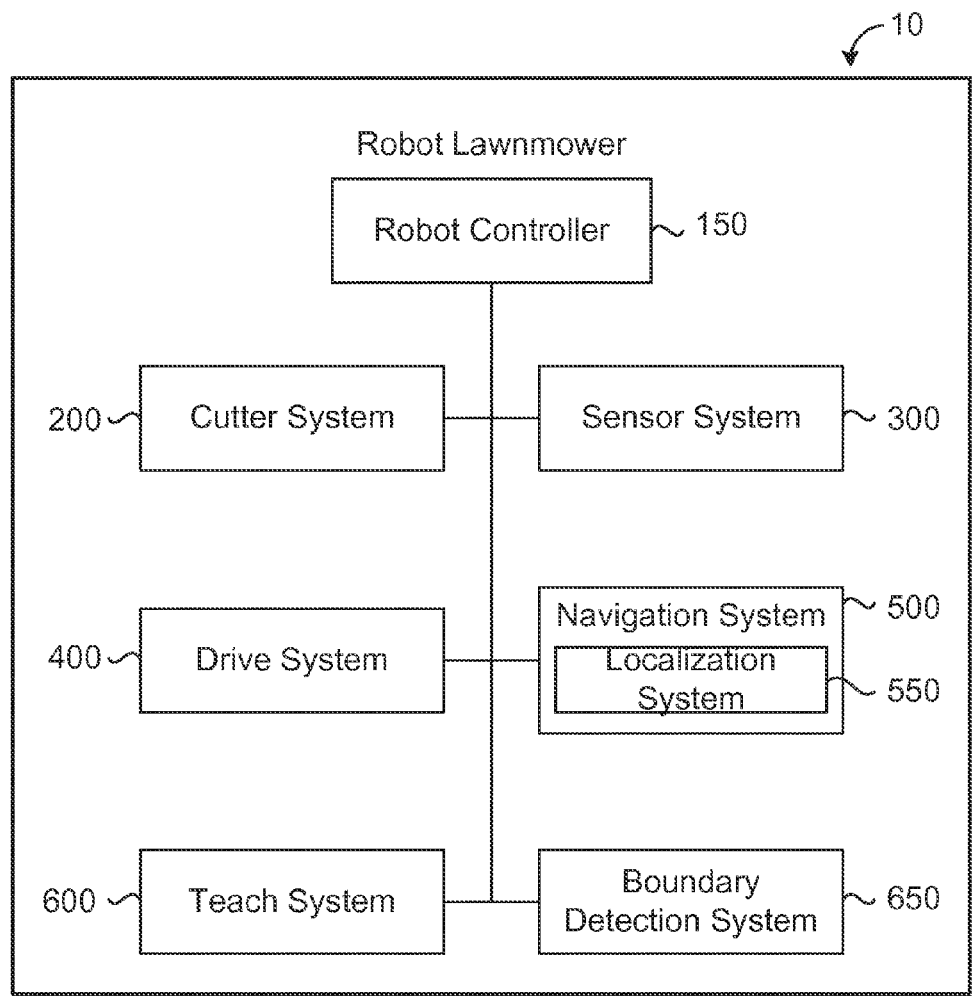
FIG. 3 is a schematic view of an exemplary autonomous lawn care mobile robot.
Figure 4:
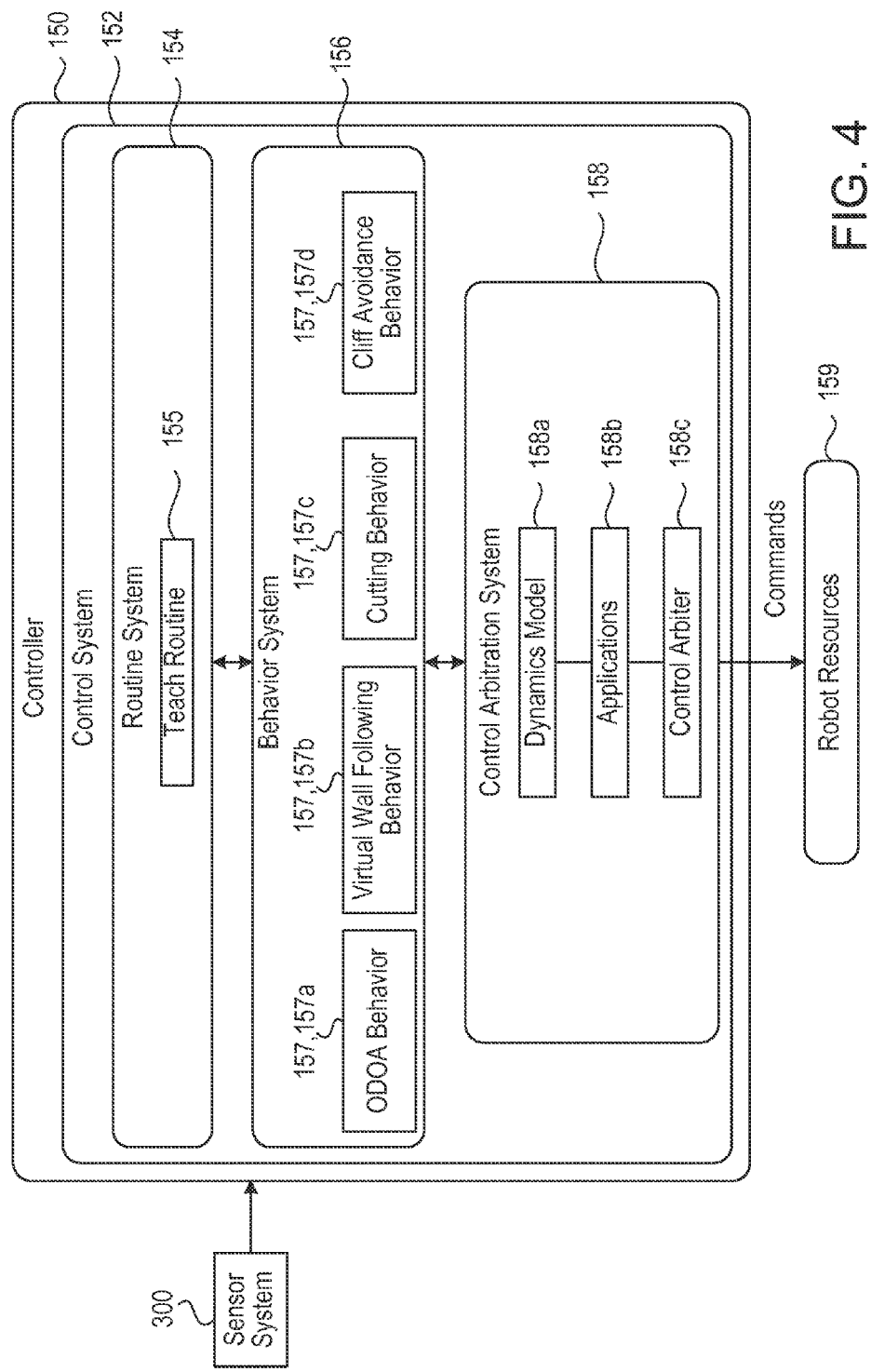
FIG. 4 is a schematic view of an exemplary controller for an autonomous lawn care mobile robot.

Referring to FIGS. 3 and 4, the robot 10 includes a robot controller 150 disposed within the robot by 100. The robot controller 150 (executing a control system 152) may execute routines 155 and behaviors 157 that cause the robot 10 to take an action, such as maneuvering in a (virtual) wall following manner, or changing its direction of travel when an obstacle is detected. The robot controller 150 can maneuver the robot 10 in any direction across the lawn by independently controlling the rotational speed and direction of each wheel module 411, 421, 431 (FIG. 1B) rotating the wheel 410, 420, 430 respectively. For example, the robot controller 150 can maneuver the robot 10 in the forward F, reverse (aft) A, right R, and left L directions. The robot controller 150 may direct the robot 10 over a substantially random (e.g., pseudo-random) path while traversing the lawn 20. The robot controller 150 can be responsive to one or more sensors (e.g., bump, proximity, wall, stasis, and cliff sensors) disposed about the robot body 100. The robot controller 150 can redirect the wheel modules 411, 421, 431 in response to signals received from the sensors (e.g., sensor system 300), causing the robot 10 to avoid obstacles and clutter while traversing the lawn.

In some implementations, to achieve reliable and robust autonomous movement, the robot 10 may include a sensor system 300 having several different types of sensors, which can be used in conjunction with one another to create a perception of the robust environment sufficient to allow the robot 10 to make intelligent decisions about actions taken that environment. The sensor system 300 may include one or more types of sensors 310, 320, 340 (shown in FIGS. 1B and 1C) supported by the robot body 100, which may include obstacle detection obstacle avoidance (ODOA) sensors, communication sensors, navigation sensors, etc. The ODOA sensors may include, but are not limited to: a cliff sensor detecting a cliff proximate the robot body 100 or proximate a drive element of the drive system 400; a drop sensor detecting a drop of a drive element (e.g., wheels 410, 420, 430) of the drive system 400; an accelerometer detecting a speed of the robot lawnmower 10; and/or a confinement sensor determining a proximity of the robot lawnmower to a boundary marker 810. Additional sensors 310, 320, 330 may include, but are not limited to, following sensors 310, 320, 330, edge calibrators 320, grass sensors 330, proximity sensors, contact sensors, a camera (e.g., volumetric point cloud imaging, three-dimensional (3D) imaging or depth map sensors, visible light camera and/or infrared camera), sonar, radar, LIDAR (Light Detection and Ranging, which can entail optical remote sensing that measures properties of scattered light to find range and/or other information of a distant target), LIDAR (Laser Detection and Ranging), etc. In some implementations, the sensor system 300 includes ranging sonar sensors, proximity cliff detectors, contact sensors, a laser scanner, and/or an imaging sonar.

In some examples, the sensor system 300 includes an inertial measurement unit (IMU) 360 in communication with the controller 150 to measure and monitor a moment of inertia of the robot lawnmower 10 with respect to the overall center of gravity $CG_R$ of the robot lawnmower 10. The IMU 360 may monitor a tilt of the robot 10 to allow the robot 10 to avoid mowing or maneuvering above a maximum robot tilt angle. For example, when IMU 360 detects a robot tilt, the robot lawnmower 10 may compare a measured robot inclination with known values to determine whether it is maneuvering over a threshold, tree roots, humps, hillocks, small hills, or other surface phenomena that may be treated as obstacles, but not easily detectable by bumpers or proximity sensors. The controller 150 may monitor any deviation in feedback from the IMU 360 from a threshold signal corresponding to normal unencumbered operation. For example, if the robot 10 begins to pitch away from an upright position, it may be impeded, or someone may have suddenly added a heavy payload. In these instances, it may be necessary to take urgent action (including, but not limited to, evasive maneuvers, recalibration, and/or issuing an audio/visual warning) in order to assure safe operation of the robot 10.

When accelerating from a stop, the controller 150 may take into account a moment of inertia of the robot 10 from its overall center of gravity $CG_R$ to prevent the robot 10 from tipping. The controller 150 may use a model of its pose, including its current moment of inertia. When payloads are supported, the controller 150 may measure a load impact on the overall center of gravity $CG_R$ and monitor movement of the robot 10 moment of inertia. If this is not possible, the controller 150 may apply a test torque command to the drive system 400 and measure actual linear and angular acceleration of the robot using the IMU 360, in order to experimentally determine safe limits.

In some examples, the drive system 400 includes left and right driven wheels 410, 420 and a trailing wheel 430 (e.g. a caster) (see FIG. 1B). In some implementations, the drive system 400 includes at least one drive wheel 410, 420 rotated by a respective wheel module 421, 422, such as a motor or other drive mechanism (e.g., an electric motor supplied power from a consumer-level battery, fuel cell, large capacitors, microwave receiver, an internal/external combustion engine powered by an onboard fuel source, hydraulic/pneumatic motor powered by an above aforementioned power source, large potential energy sources such as wound or compressed springs such as in hydraulic or pneumatic, vacuum accumulators, flywheels, or compressed air).

Referring again to FIG. 3, in some implementations, the robot 10 includes a navigation system 500 configured to allow the robot 10 to navigate the lawn 20 without colliding into obstacles or going outside a configured perimeter 21 of the lawn 20. Moreover, the navigation system 500 can maneuver the robot 10 in deterministic and pseudo-random patterns across the lawn 20. The navigation system 500 may be a behavior based system stored and/or executed on the robot controller 150. The navigation system 500 may communicate with the sensor system 300 to determine and issue drive commands to the drive system 400. The navigation system 500 influences and configures the robot behaviors 157, thus allowing the robot 10 to behave in a systematic preplanned movement. In some examples, the navigation system 500 receives data from the sensor system 300 and plans a desired path for the robot 10 to traverse.

In some implementations, the navigation system 500 includes a localization system 550. The localization system 550 determines a global position of the robot lawnmower 10 with respect to a global origin. In some implementations, the global origin coordinates coincide with a base station 12 from which the robot lawnmower 10 launches a run. In some examples, the localization system 550 stores the global position of the robot lawnmower 10 in the non-transitory memory 152b, e.g., every threshold period of time, such as, every 10, 20, or 30 seconds, or any other values. In some examples, the localizing system 550 includes the IMU 360 or a global positioning sensor (GPS) for determining the position of the robot 10 with respect to a global origin (e.g., the base station 12).

In some implementations, the robot 10 includes a teach system or teach monitor 600 in communication with the one or more of the controller 150, the sensor system 300, the drive system 400, and the navigation system 500. The teach monitor 600 is also in communication with an operator feedback unit 700 (FIG. 7B) having an operator display 750. The operator feedback unit 700 may receive an input from an operator indicating that the operator wants to teach a perimeter 21 (FIG. 7D) of the lawn 20 to the robot lawnmower 10 (e.g., by pressing a START/PAUSE button 720, discussed below). The teach monitor 600 determines whether the robot lawnmower 10 is in a teachable state or an unteachable state. The teach monitor 600 may make this determination based on sensor signals received from the sensor system 300 and/or the navigation system 500. During the teachable state, the robot lawnmower 10 is localized (i.e., it can determine its position or relative position relative to a reference point) and on traversable terrain. While during the unteachable state, the robot lawnmower 10 is not localized and/or not on traversable terrain.

Referring to FIGS. 1B and 4, in some implementations, the controller 150 (e.g., a device having one or more computing processors 152a in communication with non-transitory memory 152b capable of storing instructions executable on the computing processor(s) 152a) executes a control system 152, which includes a routine system 154, a behavior system 156, and a control arbitration system 158 in communication with each other. The control arbitration system 158 allows robot applications 158b to be dynamically added and removed from the control system 152, and facilitates allowing applications 158b to each control the robot 10 without needing to know about any other applications 158b. In other words, the control arbitration system 158 provides a simple prioritized control mechanism between applications 158b and resources 159 of the robot 10.

The applications 158b can be stored in non-transitory memory 152b or communicated to the robot 10, to run concurrently on (e.g., on a processor) and simultaneously control the robot 10. The applications 158b may access behaviors 157 of the behavior system 156 and routines 155 of the routine system 154. The independently deployed applications 158b are combined dynamically at runtime and to share robot resources 159 (e.g., drive system 400 and/or cutting system 200). A low-level policy is implemented for dynamically sharing the robot resources 159 among the applications 158b at run-time. The policy determines which application 158b has control of the robot resources 159 as required by that application 158b (e.g. a priority hierarchy among the applications 158b). Applications 158b can start and stop dynamically and run completely independently of each other. The control system 152 also allows for complex behaviors 157 which can be combined together to assist each other.

The control arbitration system 158 includes one or more application(s) 158b in communication with a control arbiter 158c. The control arbitration system 158 may include components that provide an interface to the control arbitration system 158 for the applications 158b. Such components may abstract and encapsulate away the complexities of authentication, distributed resource control arbiters, command buffering, coordinate the prioritization of the applications 158b and the like. The control arbiter 158c receives commands from every application 158b and generates a single command based on the applications' 158b priorities and publishes it for its associated resources 159. The control arbiter 158c receives state feedback from its associated resources 159 and may send it back up to the applications 158b. The robot resources 159 may be a network of functional modules (e.g., actuators, drive systems, and groups thereof) with one or more hardware controllers. The commands of the control arbiter 158c are specific to the resource 159 to carry out specific actions. A dynamics model 158a executable on the controller 150 is configured to compute the center for gravity (CG), moments of inertia, and cross products of inertial of various portions of the robot 10 for the assessing a current robot state.

In some implementations, a routine 155 or a behavior 157 is a plug-in component that provides a hierarchical, state-full evaluation function that couples sensory feedback from multiple sources, such as the sensor system 300, with a-priori limits and information into evaluation feedback on the allowable actions of the robot 10. Since the routines and behaviors 157 are pluggable into the application 158b (e.g. residing inside or outside of the application 158b), they can be removed and added without having to modify the application 158b or any other part of the control system 152. Each routine and/or behavior 157 is a standalone policy. To make routines and/or behaviors 157 more powerful, it is possible to attach the output of multiple routines and/or behaviors 157 together into the input of another so that you can have complex combination functions. The routines 155 and behaviors 157 are intended to implement manageable portions of the total cognizance of the robot 10.

In the example shown, the behavior system 156 includes an obstacle detection/obstacle avoidance (ODOA) behavior 157a for determining responsive robot actions based on obstacles perceived by the sensor (e.g., turn away; turn around; stop before the obstacle, etc.). Another behavior 157 may include a virtual wall following behavior 157b for driving adjacent a detected virtual wall or boundary markers 810. The behavior system 156 may include a cutting behavior 157c for cutting the grass in a cornrow pattern, and a cliff avoidance behavior 157d (e.g., the robot 10 detects an incline and avoids falling from the incline).

Figure 5:
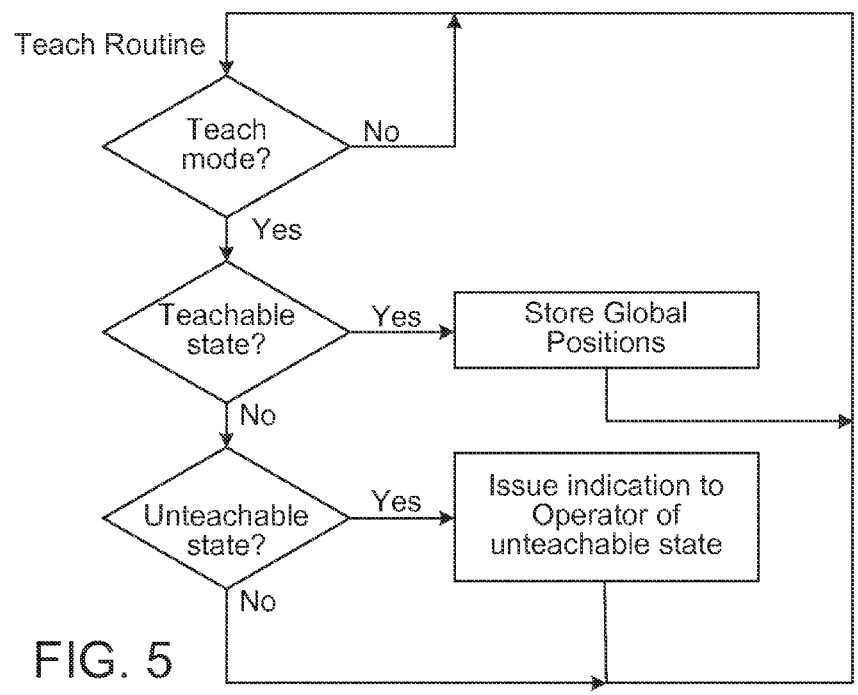
FIG. 5 is a perspective view of an exemplary teaching routine.

Referring to FIGS. 4 and 5, in some implementations, the routine system includes a teach routine 155. The data processing device 152a of the controller 150 executes the teach routine 155 when the controller 150 is in a teach mode for tracing a confinement perimeter 21 (FIG. 7D) around the lawn 20 as a human operator pilots the robot lawnmower 10. When the robot lawnmower 10 is in the teachable state, the teach routine 155 stores global positions 21a determined by the localization system 550 in the non-transitory memory 152b, and when the robot lawnmower 10 is in the unteachable state, the teach routine 155 issues an alert or indication to the operator of the unteachable state, which may be outputted via the operator feedback unit 700 (FIG. 7B). The teach routine 155 has a goal of storing enough perimeter positions 21i (i=1-n) (e.g., global positions determined by the localizing system 550) to map a geometric contour of the confinement perimeter 21 while the human operator pilots the robot lawnmower 10 for a duration of the teach mode. The duration of the teach mode depends on the size of the lawn 20 and on the speed that the operator is piloting the robot lawnmower 10. The geometric contour defines a confinement perimeter 21 that the robot lawnmower 10 avoids crossing while it is autonomously cutting the lawn 20 in the autonomous mode. The teach routine 155 determines a traveled path of the robot lawnmower based on the stored perimeter positions/global positions 21a and indicates whether the traveled path begins at the global origin and ends at the global origin. In some examples, during the teachable state, the robot lawnmower 10 is on a terrain of the lawn 20 traversable by the robot lawnmower 10 during an autonomous mode and piloted at a speed of between about 0.5 meters/second and about 1.5 meters/second.

In some implementations, the teach monitor 600 determines that the robot lawnmower 10 is in the unteachable state when the sensor system 300 detects at least one of an obstacle or water 25 along the drive path of the robot lawnmower 10 (e.g., via the sensor system 300), a tilt of the robot body 100 greater than a threshold tilt (e.g., via the IMU 360), a cliff, an activation of the drop sensor, a speed of the robot lawnmower 10 outside a threshold speed range, or a threshold proximity to a boundary marker. In such instance, the operator feedback unit 700 provides the operator with feedback indicating that the operator should change the direction of the robot 10 or the method of piloting the robot 10 (discussed below).

In some examples, the teach routine 155 requests that the human operator pilots the robot lawnmower 10 to trace the perimeter 21 about the lawn 20 a second time, and in some examples, a third or more times. The teach routine 155 compares a current global position 21a stored in the non-transitory memory to previously stored perimeter positions/global positions 21a and determines whether a variance between the two is greater than a threshold variance from a stored travel path. In some examples, the threshold variance comprises +/−30 cm. In some examples, if a current perimeter 21 is different than a previous perimeter 21, the robot lawnmower 10 requests that the operator re-pilots the robot 10 about the perimeter 21 since the robot 10 was not able to accurately determine the perimeter. For example, an operator might have hit the stop command rather than the pause command, thereby indicating teaching run completion instead of a pause. When the operator hits play to resume the teaching run, the robot lawnmower 10 does not recognize the current perimeter as previously traversed because the teaching run is still not completed. In other examples, an operator may change course on a second teaching run to pick a different path and the robot lawnmower 10 will request a third teaching run to validate adjustments between the first and second teaching runs. In still other examples, the operator may intentionally or unintentionally move part or all of a second run so that the traced perimeter 21 is partially or completely different from the first perimeter 21 traced on the first teaching run. The robot lawnmower 10 may then determine a coordinate path falling between the first and second taught perimeters 21 and set that determined coordinate path as the taught perimeter. The more samples (i.e., perimeter runs about the perimeter 21) a robot 10 stores during the teach mode, the more accurately the robot determines the perimeter 21 of the lawn 20 during its autonomous grass cutting.

Figure 6A:
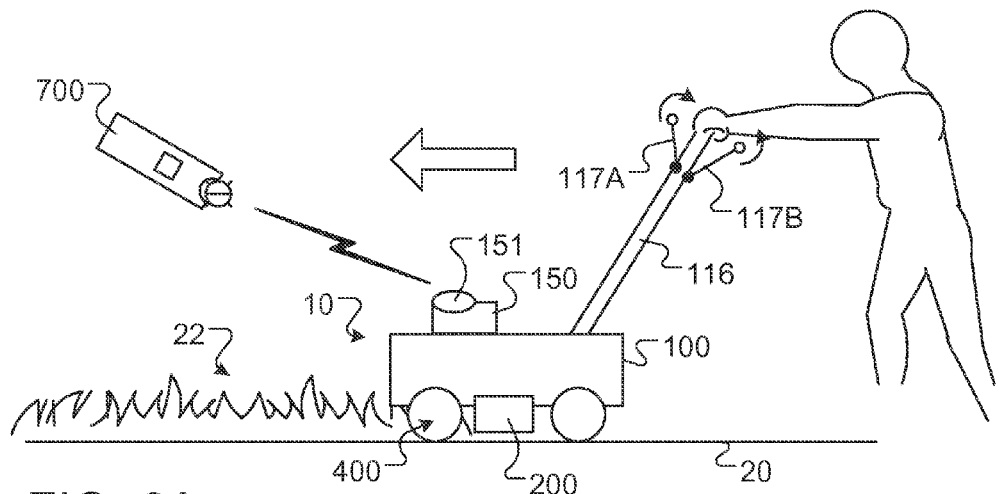
FIGS. 6A-6B are schematic views of navigating an autonomous lawn care mobile robot.

Referring to FIG. 6A, in some implementations, an operator manually leads the robot 10 to teach the perimeter 21 of the lawn 20 by using an IR or wireless operator feedback unit 700 that sends a signal to a receiver 151 on the robot 10 that is in communication with the controller 150. The drive system 400 is configured to follow the signal received from the operator feedback unit 700.

Another method includes guiding the robot 10 with a push bar 116 attached to the body 100. The push bar 116 may be detachable from or stowable on the robot body 100. In some cases, the push bar 116 includes a switch, speed setting, or joystick to advance and steer the robot 10. In one instance, the push bar 116 includes one or more pressure or strain sensors, monitored by the robot 10 to move or steer in a direction of pressure (e.g., two sensors monitoring left-right pressure or bar displacement to turn the robot 10). In another instance, the push bar 116 includes a dead man or kill switch 117A in communication with the drive system 400 to turn off the robot 10. The switch 117A may be configured as a dead man switch to turn off the robot 10 when a user of the push bar 116 ceases use or no longer maintains contact with the push bar 116. The switch 117A may be configured act as a kill switch when the push bar 116 is stowed, allowing a user to turn off the robot 10. The dead man or kill switch 117A may include a capacitive sensor or a lever bar. In another instance, the push bar 116 includes a clutch 117B to engage/disengage the drive system 400. The robot lawnmower 10 may be capable of operating at a faster speed while manually operated by the push bar 116. For example, the robot 10 may operate at an autonomous speed of about 0.5 m/sec and a manual speed greeter than 0.5 m/sec (including a "turbo" speed actuatable to 120-150% of normal speed). In some examples, the push bar 116 may be foldable or detachable during the robot's autonomous lawn mowing.

Figure 6B:
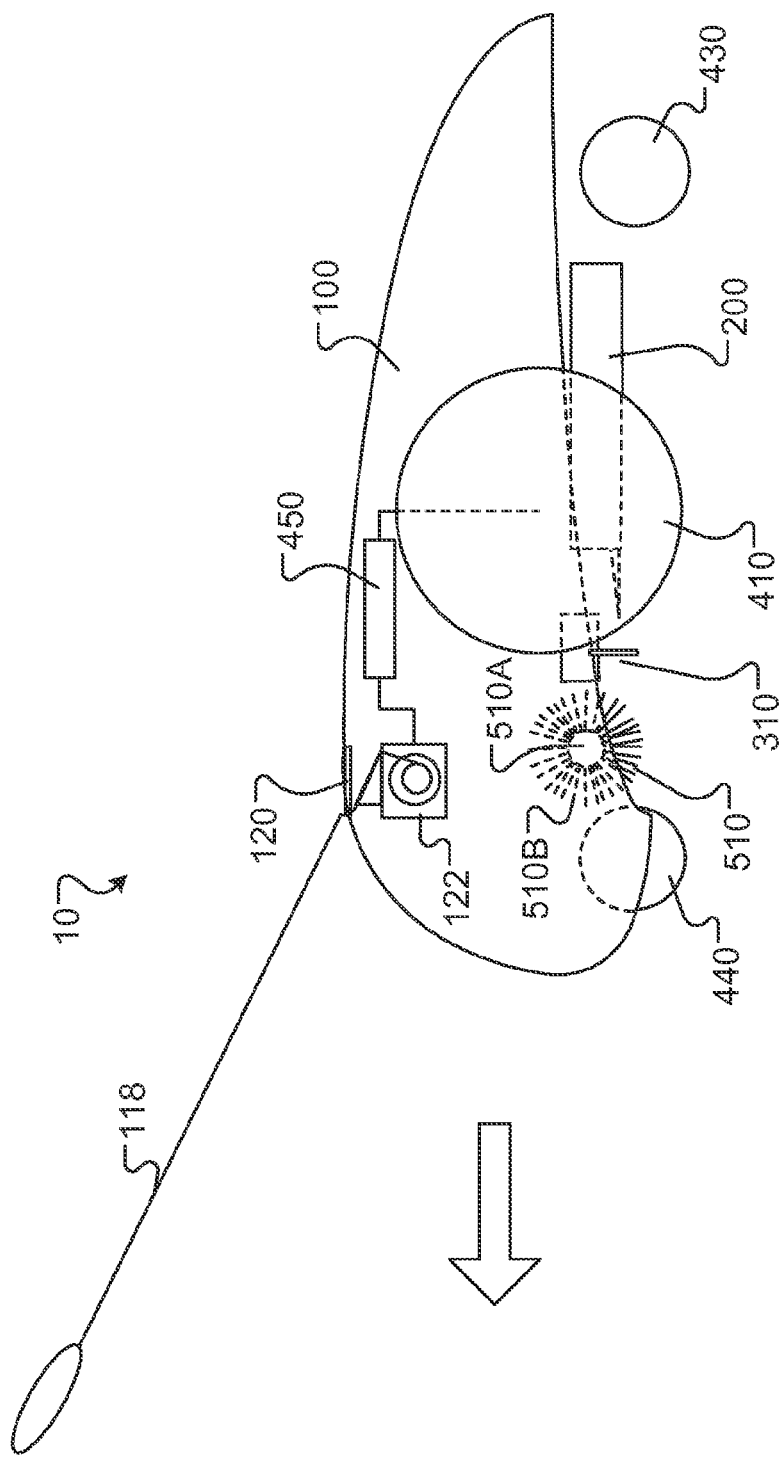

Referring to FIG. 6B, in yet another method of navigating the robot 10, the robot 10 includes a pull leash or retractable lead wire 118 fed through a wire guide 120 from a spool 122. In this example, the drive system 400 includes a controller 450 carried by the body 100 and controlling the release and retraction of the spool 122. The pull wire extends for 6-10 feet, for example, and the robot 10 monitors the amount of extension directly or indirectly (encoder, etc.) as well as the direction in which the wire is pulled (monitoring a position of the wire guide 120). The robot 10 follows the direction of the pull and controls speed to maintain a wire length.

Figure 7A:
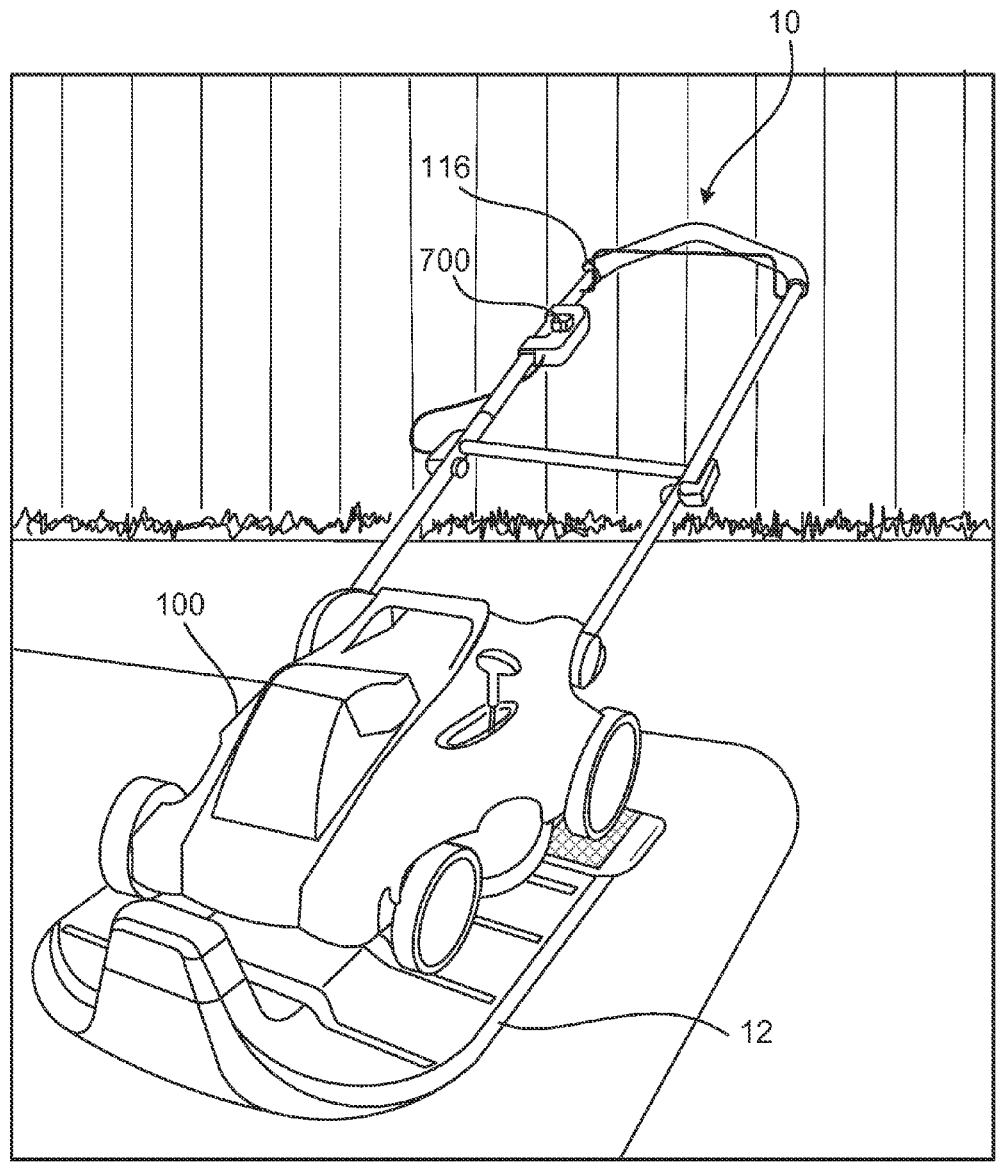
FIG. 7A is a schematic view of an exemplary autonomous lawn care mobile robot docked in its base station.
Figure 7B:
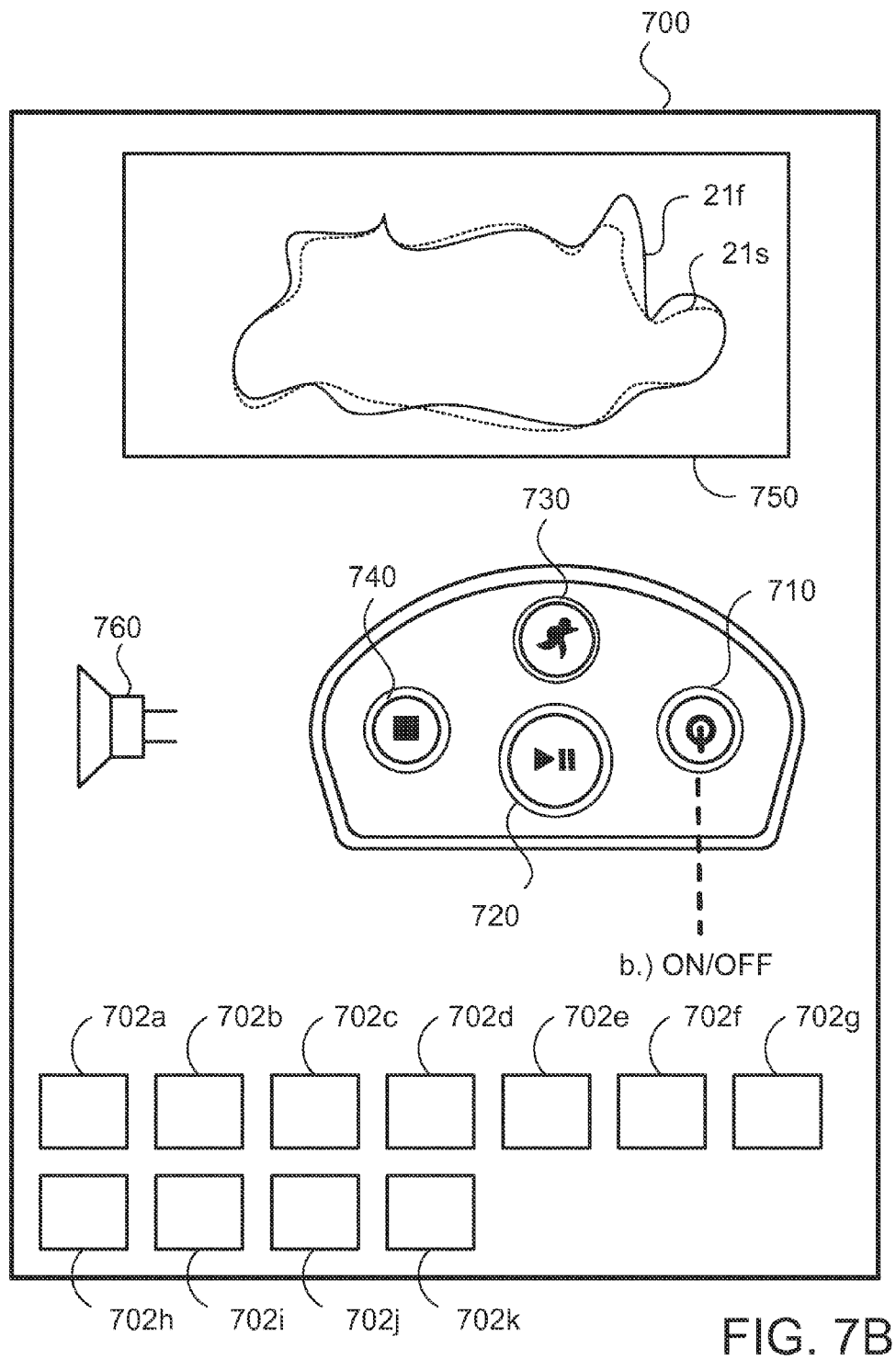
FIG. 7B is a perspective view of an exemplary operator feedback unit of the autonomous lawn care mobile robot of FIG. 7A.

FIGS. 7A-7H illustrate a method of piloting the robot lawnmower 10 around the lawn 20 to determine a perimeter 21 of the lawn 20. Referring to FIG. 7A, a robot lawnmower 10 is depicted being charged on a base station 12.

FIG. 7B illustrates an example user interface. The user interface may be an operator feedback unit 700 in communication with the teach monitor 600 or the controller 150. The operator feedback unit 700 may be releasably mountable on a push bar 116 of the robot 10 (e.g., attached to the robot body 100). The operator feedback unit 700 may be configured to allow an operator to remotely drive the robot lawnmower 10. Moreover, the operator feedback unit 700 may emit a human-perceptible signal configured to alert the human operator of an unteachable state and indicate a piloting correction in a pose or motion of the robot lawnmower 10 that returns the robot lawnmower 10 to the teachable state. The human-perceptible signal may be one or more of a visual, audible, or sensory feedback alert, such as vibration. In one example, the human-perceptible signal is a visual green-yellow-red light indicating the teachable state, moving away from teachable state and an unteachable state respectively. For example, if the teachable condition is that of an operator pushing the robot lawnmower at a threshold speed during a teaching run, the visual indicator would remain green while the walking speed remained within an upper and lower speed threshold and turn yellow upon approaching either speed threshold. The light would then turn red if the operator failed to head the yellow warning. In other examples, the visual indicator may be a light of intensifying brightness indicating movement toward an unteachable state, the brightest setting being an indication of unteachable state. In other examples, the visual indicator may be a light that changes for solid during a teachable state to a slow blink near thresholds indicating an approaching unteachable state and a high rate of blinking in an unteachable state. In some examples, the green, yellow, red visual indication light may be combined in combination with intensity settings and/or variable blinking to prove an operator with noticeable visual feedback.

In some examples, the operator feedback unit 700 includes an inertial measurement unit 702a, an accelerometer 702b, a gyroscope 702c, a microphone 702d, a visual display 750, a speaker 760, a user command interface 702e, a global positioning sensor 702f, a vibrational unit 702g, a blue tooth communication module 702h, a wireless communication module 702i, one or more locally hosted applications 702j, and/or one or more web hosted applications 702k. Therefore, the operational feedback unit 700 may be a smart phone or smart device. In some examples where the human operator places boundary markers 810 about the perimeter 21 of the lawn 20 (discussed below), the operator feedback unit 700 may be in wireless communication with the one or more boundary markers 810 positioned along the perimeter 21 of the lawn 20. The operator feedback unit 700 may display the state (e.g., an autonomous mode, or a teaching mode including a teachable state, and unteachable state of the robot 10) on its display 750. The operator feedback unit 700 receives one or more user commands and/or displays a status of the robot 10. The operator feedback unit 700 is in communication with the controller 150 such that one or more commands received by the operator feedback unit 700 can initiate execution of a routine 155 by the robot 10. In some examples, the operator feedback unit 700 includes a power button 710, which allows a user to turn on/off the robot 10 and a STOP button 740 to indicating completion of a teaching lap around the geometric shape of the perimeter.

Figure 7C:
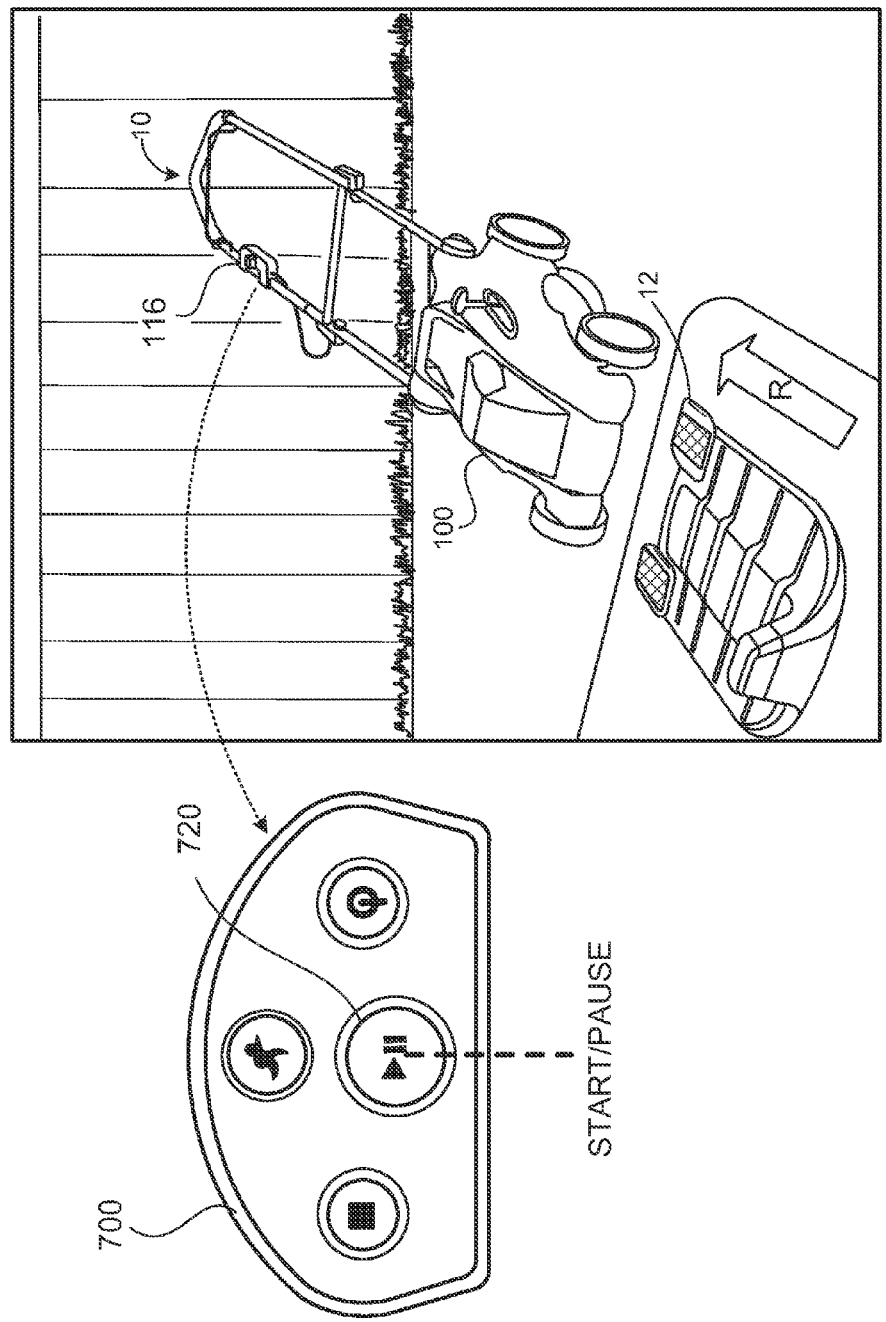
FIG. 7C is a schematic view of the exemplary autonomous lawn care mobile robot of FIG. 5A as it being pulled back from its base station.
Figure 7D:
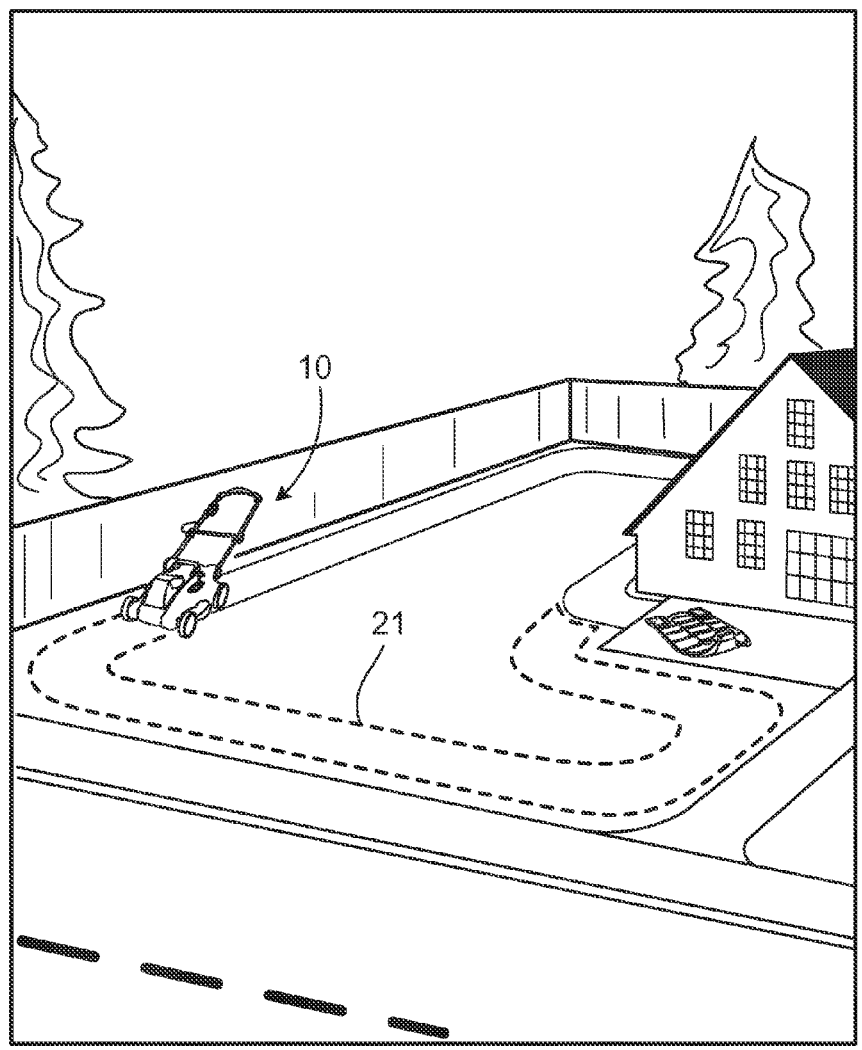
FIG. 7D is a schematic view of the exemplary autonomous lawn care mobile robot of FIG. 7A as it is being pushed by a user to measure the lawn perimeter.
Figure 7E:
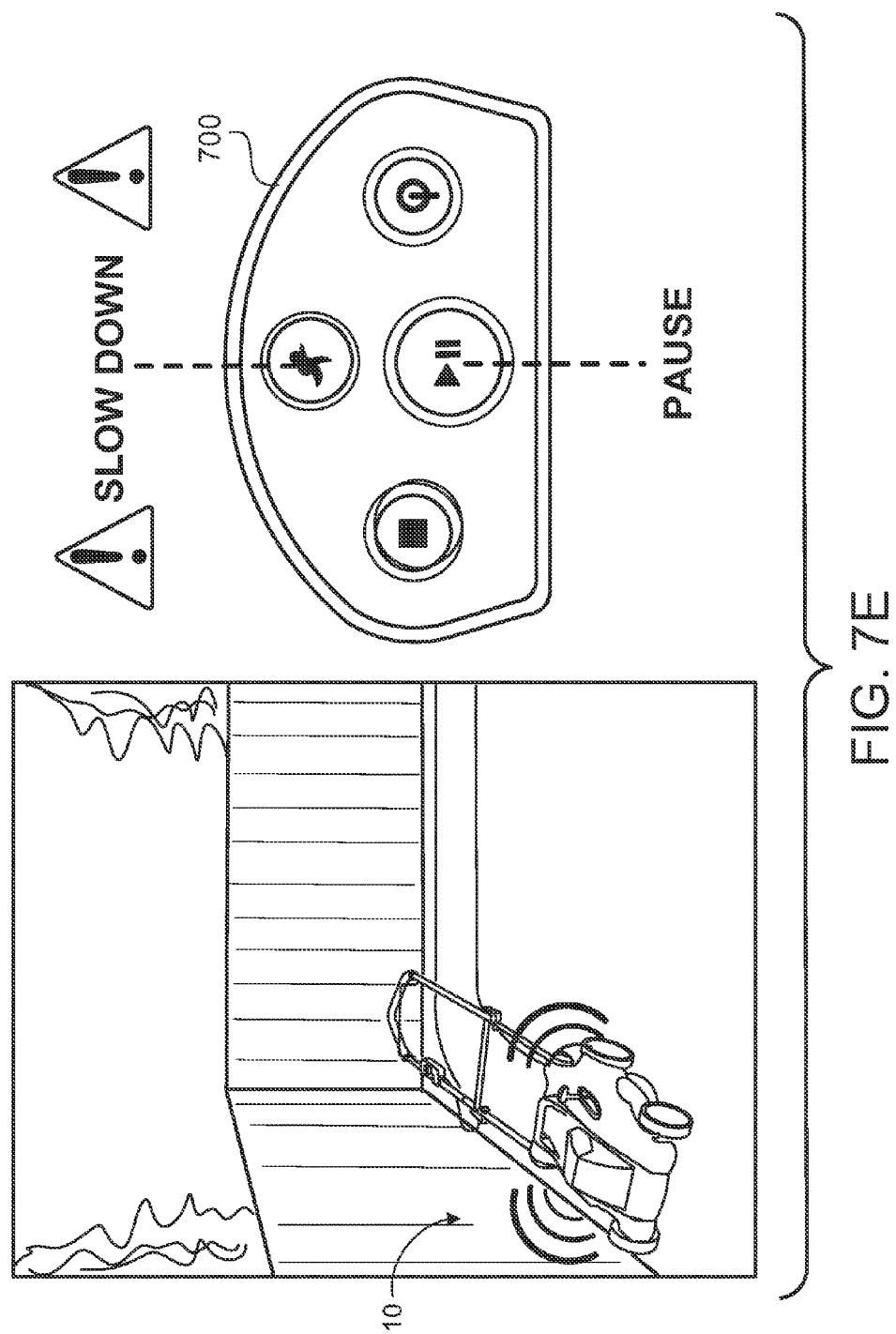
FIG. 7E is a schematic view of the exemplary autonomous lawn care mobile robot of FIG. 7A as it is being pushed at a speed greater than a threshold speed, by a user to measure the lawn perimeter.
Figure 7G:
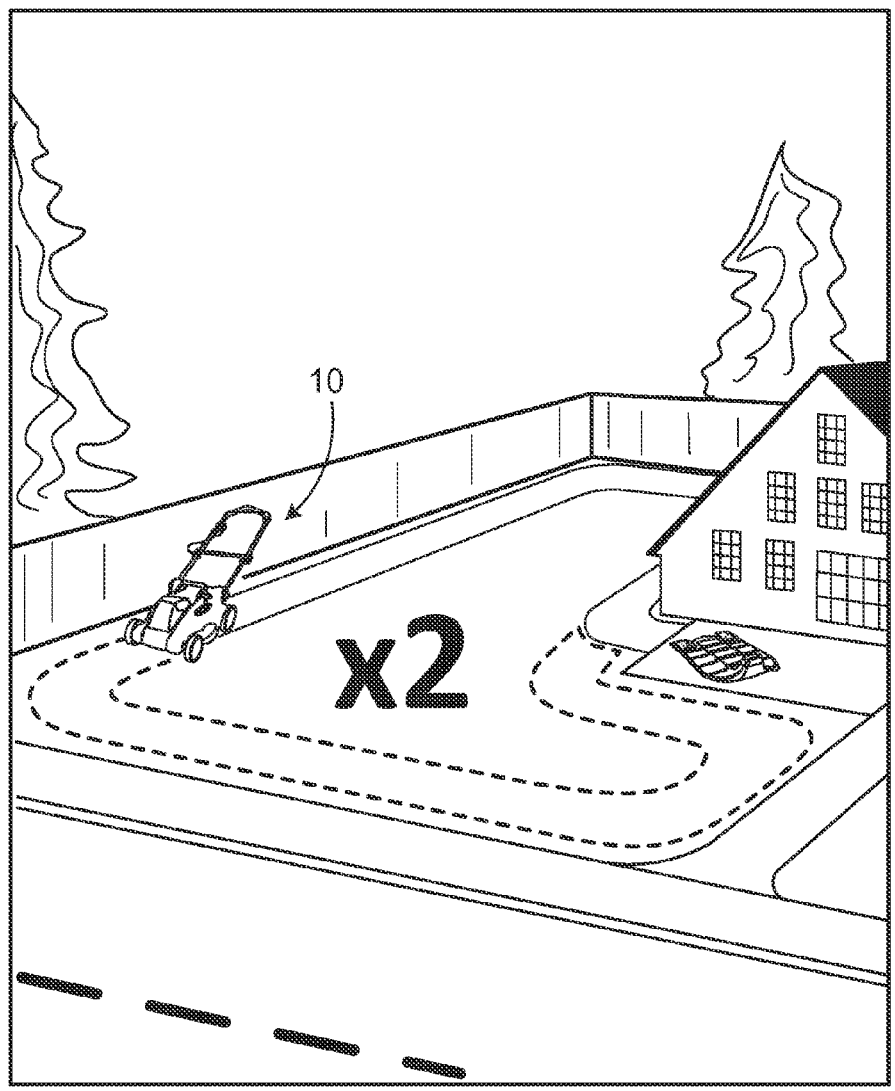
FIG. 7G is a schematic view of the exemplary autonomous lawn care mobile robot of FIG. 7A as it is being pushed by a user for the second time to measure the lawn perimeter.

In some implementations, a human operator places the robot lawnmower 10 on the charging base station 12, allowing the robot lawnmower 10 to charge. Once the robot lawnmower 10 is charged, the operator may remove the robot lawnmower 10 from the charging base station 12, by pulling the robot 10 in a rearward direction R, to teach the robot lawnmower 10 the perimeter 21 of the lawn 20. The operator pushes the power button 710 to turn the robot lawnmower 10 on. When the operator is ready to start measuring the perimeter 21 of the lawn 20, the operator presses the START/PAUSE button 720, as shown in FIG. 7C, to begin a teach run (i.e., piloting the robot 10 to determine a perimeter 21). The human operator starts a first walk around the perimeter 21 in any direction as close to the outer edges of the lawn 20 as possible, e.g., as shown in FIG. 7D. In some implementations, during the teach mode, the operator may pause the teach run and resume at a later time. Therefore, if the operator pushes the START/PAUSE button 720 during a teach run, the operator may resume measuring the parameter at a later time from the position he stopped by pushing the START/PAUSE button 720.

In some implementations, the human operator may be piloting the robot lawnmower 10 in a manner that requires correction, thus putting the robot 10 in unteachable state. When the robot lawnmower 10 detects that it is in the unteachable state during a teach run, the robot lawnmower 10 alerts the operator (e.g., via the operator feedback unit 700) to change a direction or speed of the robot lawnmower 10, so that the robot lawnmower 10 continues to record the perimeter 21 and/or return to traveling on traversable terrain. For instance, the robot lawnmower 10 may enter the unteachable state when the operator pushes the robot lawnmower 10 in an area of the lawn 20 where the robot 10 loses localization, when the user is on a second teaching path that varies from the first teaching path, or when the user pushes the robot lawnmower 10 too fast or pushing the robot lawnmower 10 over terrain that is too bumpy or tilted.

In some examples, the terrain is too bumpy. The operator may try to push the robot lawnmower 10 between a divot and a rock, causing the robot lawnmower 10 to tilt at an angle (e.g., 30 degrees). The operator may not teach the robot lawnmower 10 a path that goes through topography that the robot 10 cannot traverse in the autonomous mode. Therefore, the robot lawnmower 10 alerts the operator (e.g., via the operator feedback unit 700) to select a different path. As previously described, the robot lawnmower 10 may alerts the operator via the operator feedback unit 700 to provide one of a visual signal on the display 750, an audible signal through the speaker 760, or tactile signal such a vibration from the vibrational unit 702g of the operator feedback unit 700.

In some examples, the operator is pushing the robot lawnmower 10 too fast or too slow during the teaching mode (see FIG. 7E), thus placing the robot in the unteachable state. Therefore, the robot lawnmower 10 alerts the user to either increase the speed of the robot lawnmower 10 or decrease the speed of the robot lawnmower 10. In some examples, operator feedback unit 700 includes a speed bump 730 that will light or flash (green, yellow, red light) when the robot lawnmower 10 is going at a speed greater than a threshold speed or lower than a threshold speed.

In some instances, as will be discussed later, boundary markers 810 placed along the perimeter of the lawn 20 aid localization of the robot lawnmower 10. When the robot lawnmower 10 loses communication with the boundary markers 810, the robot lawnmower 10 may alert the user to change paths to remain within the confinement of the boundary markers 810.

In some examples, the teaching routine 155 requires the operator to traverse the perimeter 21 of the lawn 20 a second time (or more). Once the operator completes the first teaching run, the robot 10 alerts the operator that a second run is needed. In one example, the operator hits the STOP button 740 to affirmatively indicate completion of a teaching run around the perimeter 21 of the lawn 20. In some examples, the robot 10 allows the operator to either complete the second teaching run right after the first teaching run or wait until later. In some examples, if the operator completed the second teaching run and it is different from the first teaching run, i.e., there is a variance between the two perimeters 21 greater than a threshold variance, then the robot 10 alerts the user that second run (or subsequent run) is too different from previous run, and thus the robot 10 requires another teaching run to learn the perimeter 21 of the lawn 20. In some examples, when the operator completes a teaching run, the display 750 of the operator feedback unit 700 displays a first shape of the first perimeter 21f. After the operator completes a subsequent teaching run, the display 750 of the operator feedback unit 700 displays the shape of the most recent perimeter 21s overlaid on top of the shape of the first perimeter 21s. Therefore, the operator is capable of viewing the different shapes 21f, 21s of the traverse perimeter 21. When the shapes 21f, 21s are significantly different (e.g., having a variance greater than a threshold), the display 750 of the operator feedback unit 700 alerts the operator to verify that the operator pressed the START/PAUSE button 720 and pressed the STOP button 740 indicating that the teaching run was completed. For example, the teaching run may be completed when the robot lawnmower 10 is returned to the base station 12 (global origin).

When the user has completed the teaching run, the user may dock the robot lawnmower 10 in its base station 12, allowing the robot lawnmower 10 to recharge. When the robot lawnmower 10 is in its base station 12, the operator may press the stop button 740 (FIGS. 7B and 7F), indicating that the teach run is complete.

Referring to FIGS. 3 and 8A-8G, in some implementations, the robot 10 includes a boundary detection system 800 that includes a boundary detection scanner 350 (see FIGS. 1B and 1C) disposed on the robot body 100 and configured to perform a scan match of the perimeter 21. Additionally, in implementations including boundary markers 810 placed along the perimeter 21 of the lawn 20, the boundary markers 810 are individually identifiable by adjacent scan match data and the robot lawnmower 10 is able to localize to the individually identifiable boundary markers 810. In some implementations, the boundary markers 810 may include other individual identification means perceptible to the robot lawnmower 10, such as a bar code or encoded signal to enable the robot lawnmower 10 to localize it.

As shown in the figures, boundary markers 810 (e.g., beacons) are placed around the perimeter of the lawn 20 to constrain or influence a behavior 157 of the robot 10. The boundary markers 810 create a virtual wall that constrains the robot 10 from going outside its boundaries. To create the virtual wall, the boundary markers 810 are each within a line of sight of another adjacent beacon 810. The boundary markers 810 may include a home marker 810a that an operator can place in a position indicating a global origin (e.g., base station 12 or two boundary markers places side by side). The operator distributes the boundary markers 810 as evenly as possible along the perimeter of the lawn 20 or confinement area, making sure that the major corners within the lawn 20 are occupied by the boundary markers 810. Each boundary marker 810 may be positioned to be in the line of sight of a forward boundary marker 810 and a rearward boundary marker 810.

In some implementations, the teach routine 155 determines the travel path of the robot lawnmower 10 by determining an angle and range of the robot lawnmower 10 to three or more boundary markers 810 in the line of sight of the robot 10. The types of boundary markers 810 may include: LIDAR scan match, passive LIDAR retro-reflectors (beacons) or both of those together. In some examples, the boundary markers 810 include: RADAR scan matching (blips), RADAR retro-reflectors (passive beacons) or both. The boundary markers 810 may include: Ultra-wide Band (UWB) beacons (which are time of flight and require an emitter on the robot 10). Other types of boundary markers 810 may also be used, such that the robot 10 may communicate with the boundary marker 810 (i.e., the robot 10 includes a receiver communicating with the boundary marker 810).

Figure 7H:
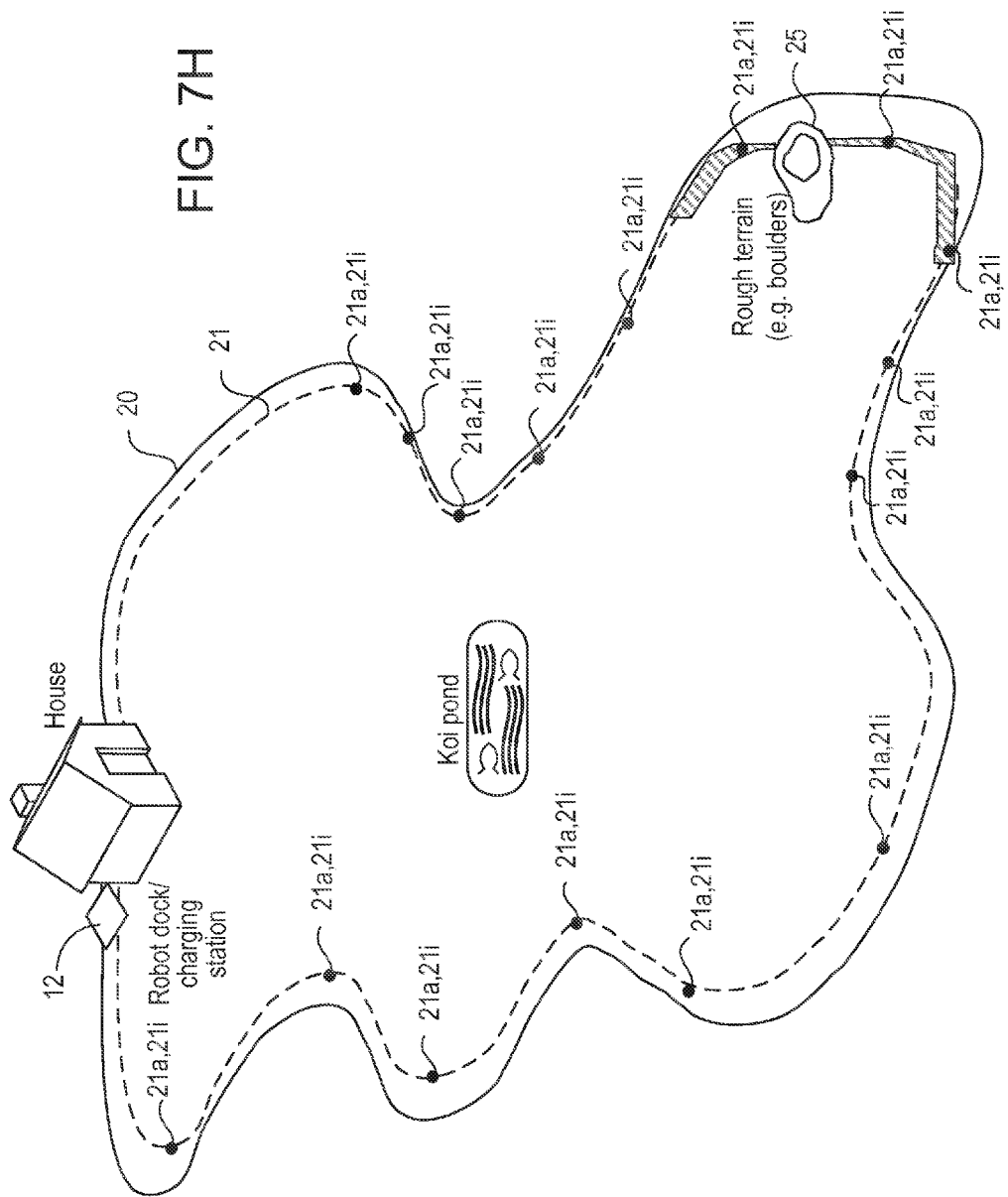
FIG. 7H is a perspective top view of an exemplary perimeter traversed by the autonomous lawn care mobile robot of FIG. 7A.
Figure 8A:
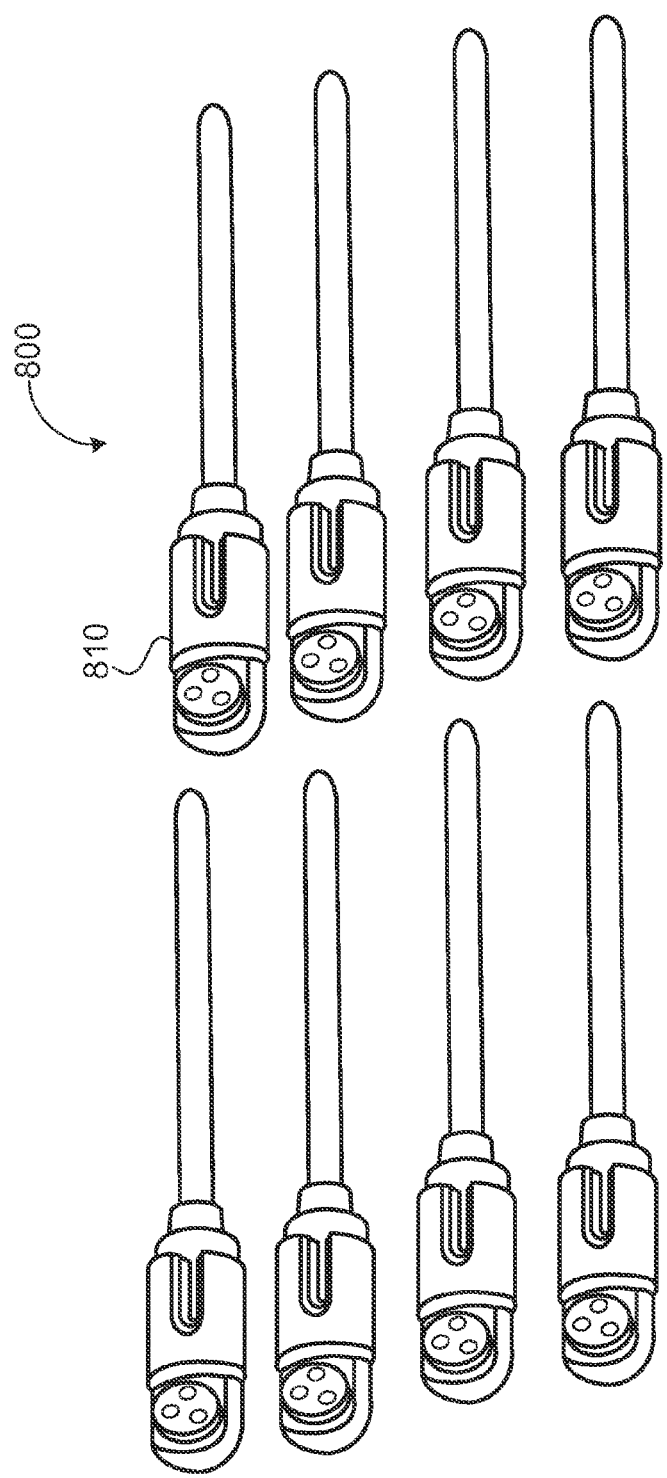
FIG. 8A is a perspective view of exemplary beacons placed along the perimeter of the lawn.
Figure 8B:
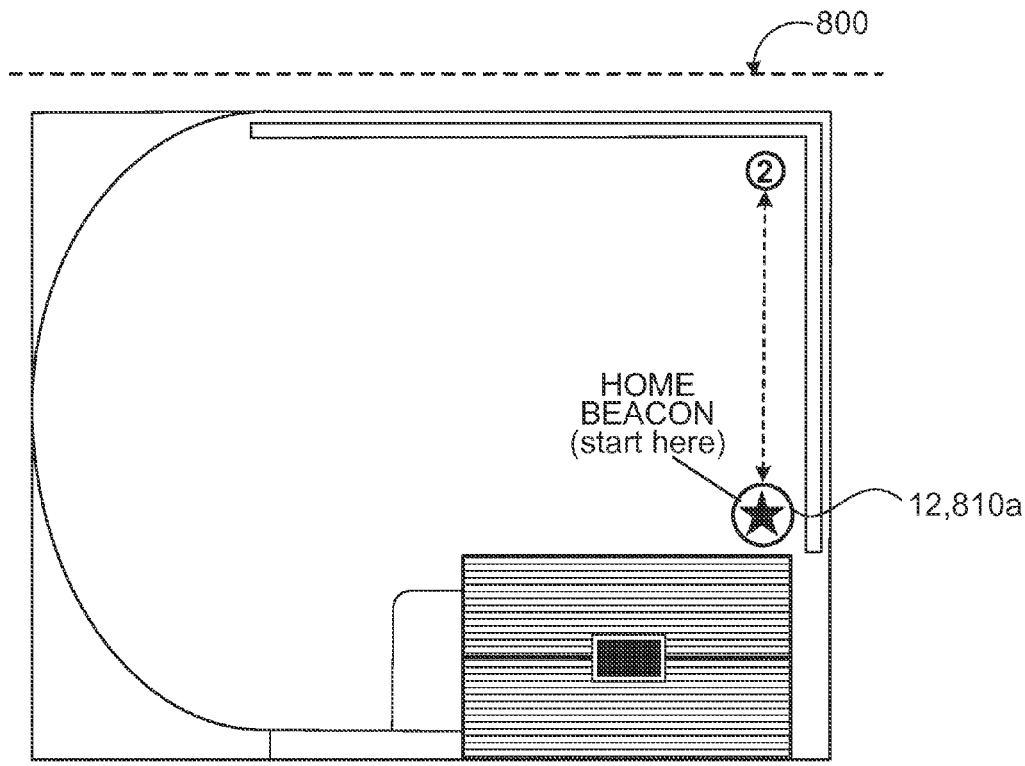
FIG. 8B is a top view of an exemplary lawn showing a first beacon positioned in a corner of the lawn.
Figures 8C, 8D:
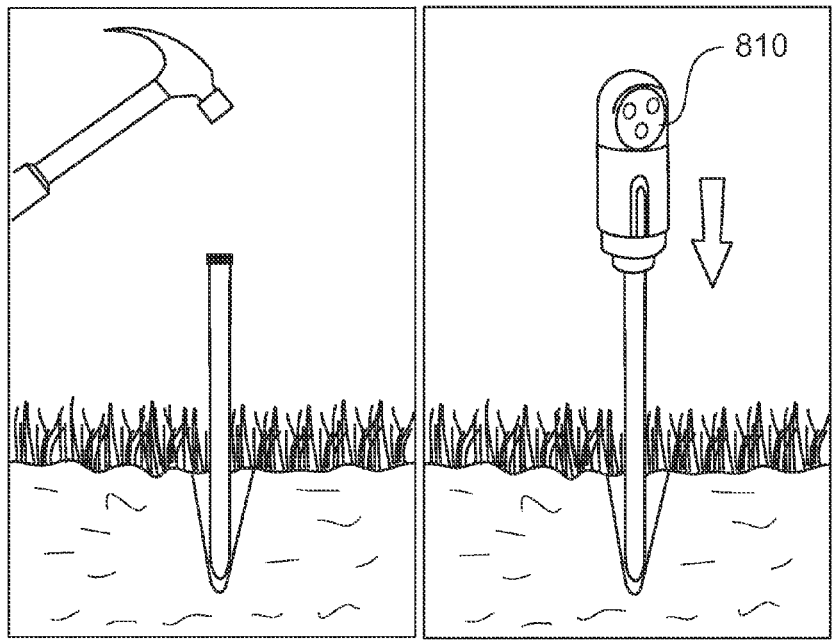
FIG. 8C is a perspective view of an exemplary stake for supporting a beacon.
FIG. 8D is a perspective view of an exemplary beacon positioned on top of the stake of FIG. 8C.
Figure 8E:
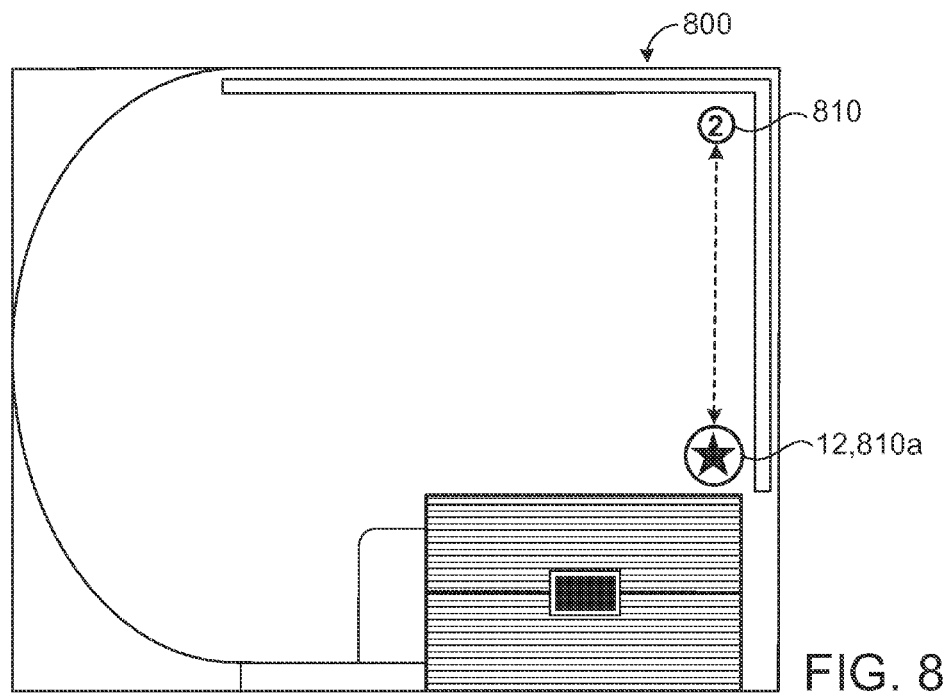
FIG. 8E is a top view of the exemplary lawn of FIG. 8B showing a second beacon placed at a second corner of the lawn.
Figure 8F:
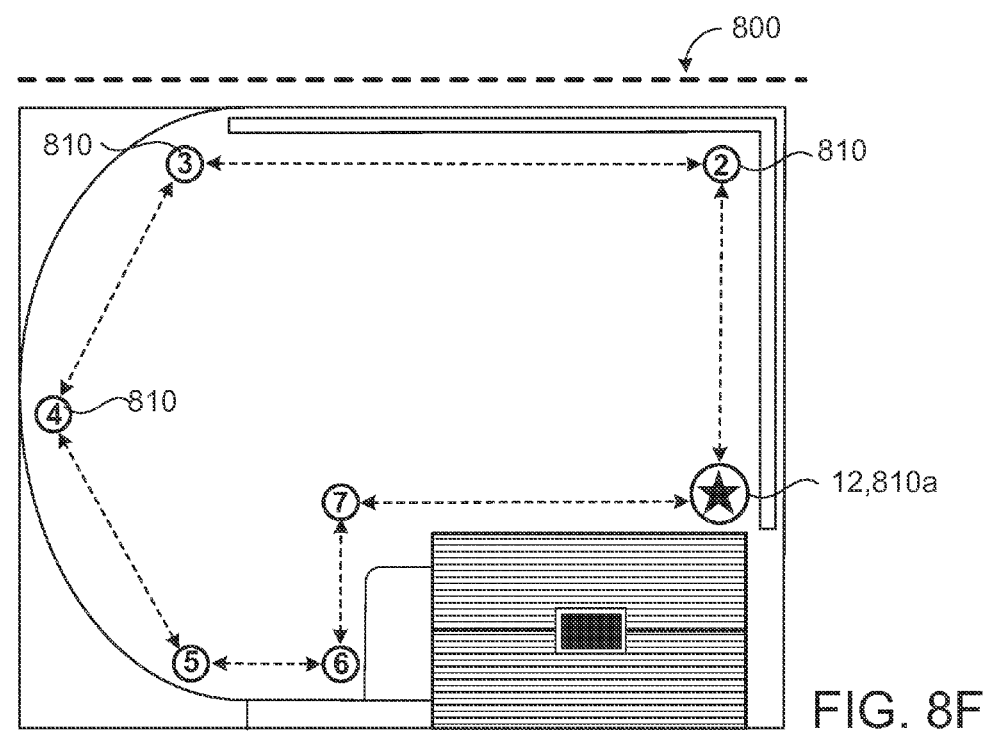
FIG. 8F is a top few of the exemplary lawn of FIG. 8B having first through seven beacons positioned about the perimeter of the lawn.
Figure 8G:
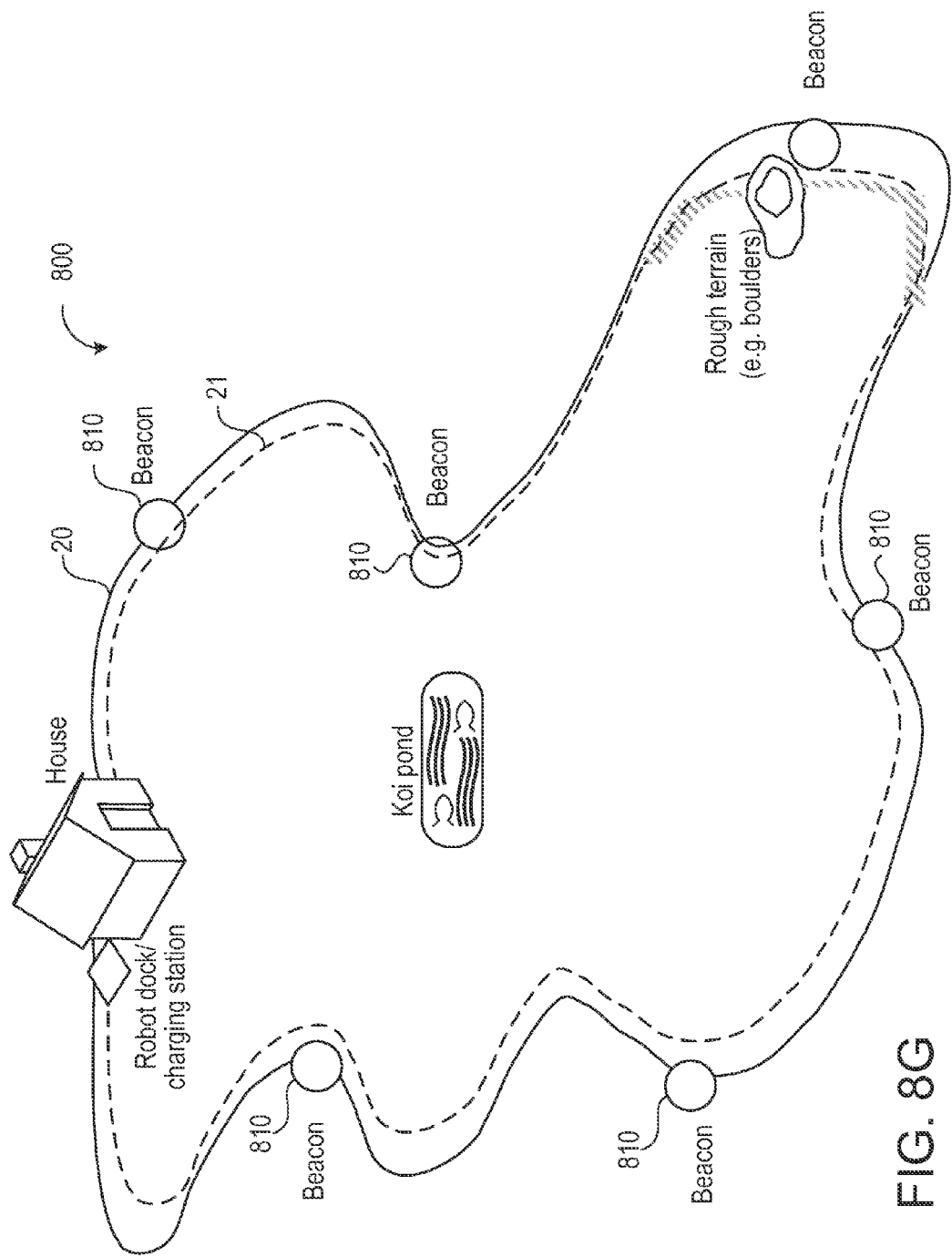
FIG. 8G is a perspective top view of an exemplary perimeter having beacons traversed by an autonomous lawn care mobile robot.
Figure 9:
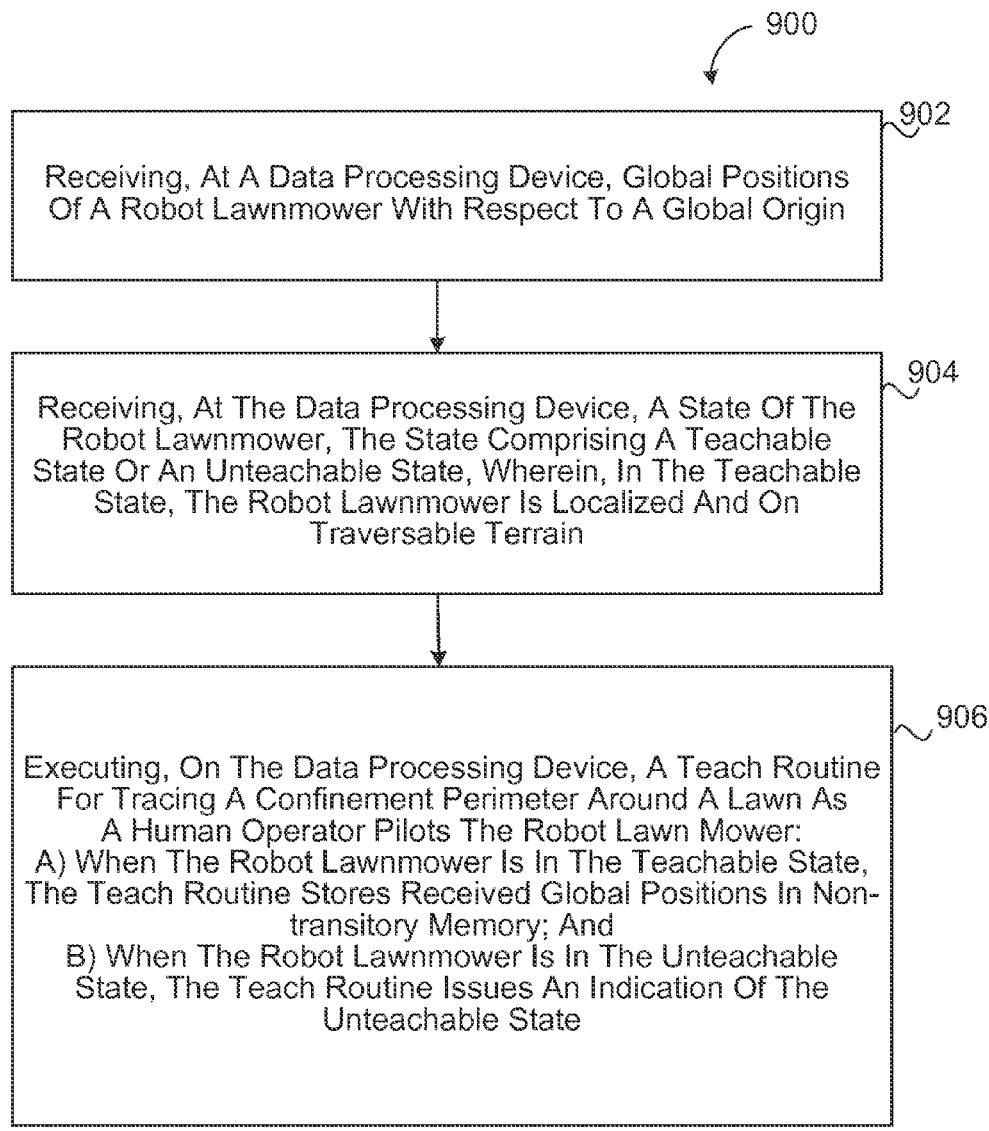
FIG. 9 is a schematic view of an exemplary arrangement of operations for operating the autonomous lawn care mobile robot.

Referring to FIGS. 7H and 9, in some implementations, a method for teaching a robot lawnmower the perimeter of an area within the lawn, allowing the robot to autonomously mow the lawn 20 at a later time. The method 900 includes receiving 902, at a data processing device, global positions 21a of a robot lawnmower with respect to a global origin. The method 900 includes receiving 904, at the data processing device, a state of the robot lawnmower, the state comprising a teachable state or an unteachable state, wherein, in the teachable state, the robot lawnmower is localized and on traversable terrain. Moreover, the method 900 includes executing 906, on the data processing device, a teach routine 155 for tracing a confinement perimeter around a lawn 20 as a human operator pilots the robot lawn mower, when the robot lawnmower is in the teachable state, the teach routine 155 stores received global positions 21a in non-transitory memory, and when the robot lawnmower is in the unteachable state, the teach routine 155 issues an indication of the unteachable state.

In some implementations, during the teachable state, the robot lawnmower 10 is on a terrain of the lawn 20 traversable by the robot lawnmower 10 during an autonomous mode and piloted at a speed of between about 0.5 meters/second and about 1.5 meters/second. The method 900 includes emitting a human-perceptible signal, when the robot lawnmower 10 is in the unteachable state. The human-perceptible signal is configured to alert a human operator of the unteachable state and indicate a piloting correction in a pose or a motion of the robot lawnmower 10 that returns the robot lawnmower 10 to the teachable state. The teach routine 155 stores enough perimeter positions/global positions 21a to map a geometric contour of the confinement perimeter 21 while a human operator pilots the robot lawnmower 10 for a duration of the teach mode. The geometric contour defining a confinement perimeter 21 that the robot lawnmower 10 avoids crossing in the autonomous mode.

In some examples, the robot lawnmower 10 includes an operator feedback unit 700. The method 900 includes displaying the state of the robot lawnmower 10, e.g., on the display 750 of the operator feedback unit 700. The human-perceptible signal includes one or more of a visual signal displayed on the display 750 of the operator feedback unit 700, an audible signal outputted from the speaker 760 of the operator feedback unit 700, and a tactile signal such a vibration from the vibrational unit 702g of the operator feedback unit 700. In some examples, the operator pilots the robot lawnmower 10 via the operator feedback unit 700. Therefore, the method 900 may include receiving, at the data processing device 152a, a piloting command for remotely piloting the robot 10.

In some implementations, the method 900 includes receiving, at the data processing device, a moment of inertia of the robot lawnmower, a proximity of an obstacle or water along a drive path of the robot lawnmower; a tilt of the robot body, a cliff proximate the robot body or a drive element of the drive system, a drop of a drive element of the drive system, a speed of the robot lawnmower, and a proximity of the robot lawnmower to a boundary marker. The method 900 includes determining that the robot lawnmower 10 is in the unteachable state when the data processing device 152a receives at least one of an obstacle or water along the drive path of the robot, a tilt of the robot body greater than a threshold tilt, a cliff, an activation of the drop sensor, a speed of the robot lawnmower outside a threshold speed range, or a threshold proximity to a boundary marker.

The teach routine 155, executing on the data processing device 152a, determines a traveled path of the robot lawnmower 10 based on the stored global positions 21a and indicates whether the traveled path begins at the global origin (e.g., the base station 12) and ends at the global origin. In some examples, the global origin includes coordinates marked by one or more boundary markers 810 positioned in the lawn 20. The boundary markers 810 may include LIDAR retro-reflectors, RADAR retro-reflectors, or ultra-wide band beacons. The teach routine 155, executing on the data processing device 152a, compares a current global position 21a stored in the non-transitory memory 152b to previously stored global positions 21a and determines whether a variance is greater than a threshold variance (e.g., +/−30 cm) from a stored travel path. The travel path may be localized to three or more boundary markers 810.

In some implementations, the method 900 includes performing a scan match on three or more adjacent boundary markers 810, where each of the three or more boundary markers 810 are individually identifiable by adjacent scan match data. The teach routine 155 determines the travel path of the robot lawnmower 20 by scan matching a current travel path scan with a stored travel path scan. The teach routine 155 determines the travel path of the robot lawnmower 10 by determining an angle and range of the robot lawnmower 10 to the three or more boundary markers.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:
1. A robot lawnmower comprising:
a robot body;
a drive system supporting the robot body and configured to maneuver the robot lawnmower over a lawn;

a localizing system configured to determine perimeter positions of the robot lawnmower with respect to an origin;

a teach monitor in communication with the localizing system and configured to determine whether the robot lawnmower is in a teachable state or in an unteachable state, the robot lawnmower being in the teachable state when the robot lawnmower is localized and on traversable terrain;

a controller in communication with the drive system, the localizing system, and the teach monitor, the controller comprising:

a data processing device; and non-transitory memory in communication with the data processing device;

wherein the controller is configured to execute a teach routine when the controller is in a teach mode for tracing a confinement perimeter around the lawn as a human operator pilots the robot lawnmower with the robot lawnmower in the teachable state, wherein the teach routine stores perimeter positions determined by the localizing system in the non-transitory memory, and wherein the teach monitor of the robot lawnmower determines whether the robot lawnmower is in the teachable state or the unteachable state; and an operator feedback unit in communication with the teach monitor or the controller and configured to emit an unteachable state indication when the teach monitor determines the robot lawnmower is in the unteachable state, the unteachable state indication configured to alert the human operator to the unteachable state and to further indicate a piloting correction of the robot lawnmower to return the robot lawnmower to the teachable state.

2. The robot lawnmower of claim 1, wherein the piloting correction includes a piloting correction in a pose or a motion of the robot lawnmower calculated to return the robot lawnmower to the teachable state.

3. The robot lawnmower of claim 1, wherein the operator feedback unit is in wireless communication with one or more boundary markers positioned along the perimeter of the lawn.

4. The robot lawnmower of claim 1, wherein the operator feedback unit is in wireless communication with the controller and comprises a user interface configured for remotely piloting the robot lawnmower.

5. The robot lawnmower of claim 1, further comprising a sensor system in communication with the teach monitor, the sensor system comprising at least one of:

an inertial measurement unit responsive to a moment of inertia of the robot lawnmower;

an obstacle sensor responsive to proximity of an obstacle or water along a drive path of the robot lawnmower;

a tilt sensor responsive to tilt of the robot body;

a cliff sensor responsive to a discrete ground elevation change proximate the robot body or a drive element of the drive system;

a drop sensor responsive to a drop of a drive element of the drive system;

an accelerometer responsive to speed of the robot lawnmower across the lawn; and a confinement sensor responsive to proximity of the robot lawnmower to a boundary marker.

6. The robot lawnmower of claim 5, wherein the teach monitor is configured to determine that the robot lawnmower is in the unteachable state in response to a signal from the sensor system.

7. The robot lawnmower of claim 1, wherein the controller, executing the teach routine, is configured to determine a traveled path of the robot lawnmower based on the stored perimeter positions and whether the traveled path begins and ends proximate the origin.

8. The robot lawnmower of claim 1, wherein the origin comprises coordinates marked by one or more boundary markers positioned in the lawn.

9. The robot lawnmower of claim 8, further comprising a boundary detection scanner disposed on the robot body and configured to perform a scan match on three or more adjacent boundary markers, each of the three or more boundary markers individually identifiable by adjacent scan match data.

10. The robot lawnmower of claim 9, wherein the teach routine determines a travel path of the robot lawnmower by scan matching a current travel path scan with a stored travel path scan.

11. A method of configuring a robotic lawnmowing system for autonomous operation, the method comprising:

receiving perimeter positions of a robot lawnmower with respect to an origin;

receiving a state of the robot lawnmower indicating whether the robot lawnmower is in a teachable state or in an unteachable state, the robot lawnmower being in the teachable state when the robot lawnmower is localized and on traversable terrain; and executing, a teach routine that traces a confinement perimeter around a lawn as a human operator pilots the robot lawnmower, wherein the teach routine stores the received perimeter positions in non-transitory memory when the received state indicates that the robot lawnmower is in the teachable state and issues an unteachable state indication when the received state indicates that the robot lawnmower is in the unteachable state, wherein the unteachable state indication includes a human-perceptible signal emitted by an operational feedback unit to alert the human operator of the unteachable state and to further indicate a piloting correction of the robot lawnmower to return the robot lawnmower to the teachable state.

12. The method of claim 11, wherein the piloting correction includes a piloting correction in a pose or a motion of the robot lawnmower selected to return the robot lawnmower to the teachable state.

13. The method of claim 11, wherein the origin comprises coordinates marked by one or more boundary markers positioned in the lawn.

14. The method of claim 11, wherein the teach routine compares a current perimeter position stored in the non-transitory memory to previously stored perimeter positions and determines whether a variance is greater than a threshold variance from a stored travel path.

15. A robotic lawnmower system, comprising:

a localizing system that records each global position of a robot lawnmower with respect to a global origin as a human operator pilots the robot lawnmower to trace a confinement perimeter around a lawn in a manual confinement perimeter teaching mode;

contour memory in which a geometric contour of the confinement perimeter is recorded while the human operator pilots the robot lawnmower for a duration of operation in the manual confinement perimeter teaching mode, the geometric contour defining a perimeter that the robot lawnmower is to avoid crossing in an autonomous mode;

a teaching property monitor configured to detect whether or not the robot lawnmower is piloted in a recordable state and on traversable terrain; and an operator feedback unit in communication with the teaching property monitor and comprising a progress indicator configured to, as the human operator pilots the robot lawnmower in the manual confinement perimeter teaching mode, emit a human-perceptible signal when the teaching property monitor detects that the robot lawnmower is not piloted in the recordable state or is not on traversable terrain, the human-perceptible signal being configured to alert the human operator to an unrecordable state or to an untraversable terrain and to further indicate a piloting correction to return the robot lawnmower to a recordable state or traversable terrain.

16. The robotic lawnmower system of claim 15, wherein the operator feedback unit is mounted on a handle of the robot lawnmower.

17. The robotic lawnmower system of claim 15, wherein the operator feedback unit is in wireless communication with one or more boundary markers positioned along the confinement perimeter and is configured to indicate a piloting correction in response to the robot lawnmower travelling proximate to or beyond the perimeter.

18. The robotic lawnmower system of claim 15, wherein a travel path of the robot lawnmower is localized by determining angle and range of the robot lawnmower to three or more boundary markers.

* * * * *